US012203288B1

(12) United States Patent
Wernlund et al.

(10) Patent No.: US 12,203,288 B1
(45) Date of Patent: Jan. 21, 2025

(54) DRIVEN LOCK SYSTEMS, FENESTRATION UNITS AND METHODS

(71) Applicant: ANDERSEN CORPORATION, Bayport, MN (US)

(72) Inventors: Chad Wernlund, Baldwin, WI (US); Justin Depew, Bayport, MN (US)

(73) Assignee: Andersen Corporation, Bayport, MN (US)

( * ) Notice: Subject to any disclaimer, the term of this patent is extended or adjusted under 35 U.S.C. 154(b) by 225 days.

(21) Appl. No.: 17/498,186

(22) Filed: Oct. 11, 2021

Related U.S. Application Data

(63) Continuation of application No. 15/860,746, filed on Jan. 3, 2018, now Pat. No. 11,162,279.

(60) Provisional application No. 62/442,067, filed on Jan. 4, 2017.

(51) Int. Cl.

| | |
|---|---|
| ***E05B 47/00*** | (2006.01) |
| ***E05B 65/08*** | (2006.01) |
| ***E05C 9/00*** | (2006.01) |
| ***E05C 9/02*** | (2006.01) |

(52) U.S. Cl.
CPC .......... *E05B 47/0012* (2013.01); *E05C 9/006* (2013.01); *E05C 9/02* (2013.01); *E05B 2047/0016* (2013.01); *E05B 2047/0017* (2013.01); *E05B 2047/0067* (2013.01); *E05B 2047/0069* (2013.01); *E05B 65/0811* (2013.01)

(58) Field of Classification Search
CPC ..... E05B 2047/0015; E05B 2047/0016; E05B 2047/0017; E05B 2047/0036; E05B 2047/0037; E05B 65/08; E05B 65/0811; E05B 65/0858; E05B 81/90; E05B 2047/0067; E05B 2047/0069; E05C 9/00; E05C 9/02; E05C 9/006; E05C 9/16
See application file for complete search history.

(56) References Cited

U.S. PATENT DOCUMENTS

| | | | |
|---|---|---|---|
| 4,135,377 | A | 1/1979 | Kleefeldt |
| 4,633,688 | A | 1/1987 | Beadat |
| 5,441,315 | A | 8/1995 | Kleefeldt |
| 5,979,199 | A | 11/1999 | Elpern |

(Continued)

FOREIGN PATENT DOCUMENTS

| | | | | |
|---|---|---|---|---|
| DE | 19537045 A1 * | 4/1997 | ......... | E05B 17/0033 |
| DE | 202011002154 U1 * | 6/2012 | ............. | E05B 77/04 |

(Continued)

OTHER PUBLICATIONS

Computer Generated Translation for DE 202011002154, Generated on Oct. 17, 2023, https://worldwide.espacenet.com/ (Year: 2023).*

(Continued)

*Primary Examiner* — Alyson M Merlino
(74) *Attorney, Agent, or Firm* — Mueting Raasch Group

(57) ABSTRACT

Driven lock systems, fenestration units including the driven lock systems, and methods of operating the driven lock systems are described herein. The driven lock systems as described herein offer a combination of powered or motorized operation in addition to manual operation, with the opportunity for a user to manually switch the lock assembly between its locked and unlocked states as needed. The need for manual operation may arise if, for example, the system loses power, the controls of the system are unavailable, etc.

20 Claims, 14 Drawing Sheets

(56) References Cited

U.S. PATENT DOCUMENTS

| | | | | |
|---|---|---|---|---|
| 6,035,676 | A * | 3/2000 | Hudspeth | E05B 47/00 70/279.1 |
| 6,089,058 | A | 7/2000 | Elpern | |
| 6,116,067 | A | 9/2000 | Myers | |
| 7,052,054 | B2 | 5/2006 | Luker | |
| 7,152,441 | B2 | 12/2006 | Friar | |
| 8,494,680 | B2 * | 7/2013 | Sparenberg | E05B 47/026 292/144 |
| 8,496,275 | B2 * | 7/2013 | Garneau | E05C 3/24 292/201 |
| 8,684,424 | B2 * | 4/2014 | Wattebled | E05B 81/20 292/201 |
| 9,482,035 | B2 | 11/2016 | Wolf | |
| 10,174,522 | B2 | 1/2019 | Denison | |
| 10,808,424 | B2 | 10/2020 | Criddle | |
| 10,822,836 | B2 | 11/2020 | Nakasone | |
| 2009/0178449 | A1 * | 7/2009 | Raatikainen | E05B 47/0688 70/277 |
| 2012/0146346 | A1 * | 6/2012 | Hagemeyer | E05C 9/02 74/519 |
| 2018/0155962 | A1 | 6/2018 | Mitchell | |
| 2019/0032368 | A1 | 1/2019 | Welbig | |
| 2020/0149327 | A1 | 5/2020 | Lammers | |

FOREIGN PATENT DOCUMENTS

| | | | | |
|---|---|---|---|---|
| EP | 1452675 | A2 * | 9/2004 | E05C 9/023 |
| EP | 2133492 | A1 * | 12/2009 | E05B 47/0011 |
| FR | 2639668 | A1 * | 6/1990 | |
| JP | 03286076 | | 11/1991 | |
| JP | 03286076 | A * | 12/1991 | |
| WO | WO-2007125163 | A1 * | 11/2007 | E05B 47/0012 |

OTHER PUBLICATIONS

U.S. Appl. No. 62/536,796, filed Jul. 25, 2017, Amesbury Group, Inc.

* cited by examiner

DRIVEN LOCK SYSTEMS, FENESTRATION UNITS AND METHODS

RELATED APPLICATION

This application is a continuation of U.S. patent application Ser. No. 15/860,746, filed on Jan. 3, 2018, which claims the benefit under 35 U.S.C. Section 119 of U.S. Provisional Patent Application Ser. No. 62/442,067 entitled "DRIVEN LOCK SYSTEMS, FENESTRATION UNITS AND METHODS" and filed on Jan. 4, 2017, each of which is incorporated herein by reference in its entirety.

Driven lock systems, fenestration units including the driven lock systems, and methods of operating the driven lock systems are described herein.

BACKGROUND

Powered locking systems for fenestration units often offer limitations for manual operation. In some cases, powered or driven locking systems may not offer the option for manual operation between locked and unlocked states—where "manual operation" as used herein means that the lock system includes a component (e.g., a lever, knob, slider, push button, etc.) that is physically moved to change the lock system between its locked and unlocked states (where the physical movement may involve one or more actions such as, e.g., sliding, rotating, pushing, pulling, etc.).

In such driven locking systems, the loss of power either automatically results in a transition from a locked state to an unlocked state for safety reasons (to allow egress from a building, etc.). That action, however, raises its own safety concerns as unwanted access to a building may be available when the lock is in the unlocked state. To address that problem, some driven locking systems incorporate battery backup systems such that power to the locking system can be maintained when power within the structure itself is lost. Even battery backup systems, however, have limitations and when the battery backup system is drained, the driven locking system will typically transition from a locked state to an unlocked state.

SUMMARY

Driven lock systems, fenestration units including the driven lock systems, and methods of operating the driven lock systems are described herein. The driven lock systems as described herein offer a combination of powered or motorized operation in addition to manual operation, with the opportunity for a user to manually switch the lock assembly between its locked and unlocked states as needed. The need for manual operation may arise if, for example, the system loses power, the controls of the system are unavailable, etc.

Unlike driven lock systems offering both manual and powered operation that require a user to "backdrive" one or more components of the drive system during manual operation of the lock, the driven lock systems described herein provide a system in which manual operation of the lock does not require back-driving of a driven actuator used in the driven lock system. In other words, the user is not required to operate the drive actuator within the drive system as well as components in the lock mechanism to move the lock between its locked and unlocked states.

In a first aspect, one or more embodiments of a driven lock system for a fenestration unit as described herein may include: a lock mechanism comprising a lock element movable between a locked state and an unlocked state; a lock actuator assembly comprising a manual actuator operably coupled to the lock element of the lock mechanism, the manual actuator configured to move the lock element between the locked state and the unlocked state; and a drive assembly operably connected to the lock element of the lock mechanism through a lock link that is rotatable about a lock link axis, wherein rotation of the lock link about the lock link axis moves the lock element of the lock mechanism between the locked state and the unlocked state, the drive assembly comprising a driven actuator configured to move the drive assembly between an extended configuration, a neutral configuration, and a shortened configuration. Movement of the drive assembly from the shortened configuration to the extended configuration rotates the lock link in a first direction about the lock link axis to move the lock element between the locked state and the unlocked state. Movement of the drive assembly from the extended configuration to the shortened configuration rotates the lock link in a second direction about the lock link axis to move the lock element between the locked state and the unlocked state, wherein the first and second directions are opposite directions.

In one or more embodiments, the drive assembly is configured to return to the neutral configuration after the driven actuator moves the drive assembly to the extended configuration. In one or more embodiments, the drive assembly remains in the neutral configuration when the lock element is moved between the locked state and the unlocked state using the manual actuator.

In one or more embodiments, the drive assembly is configured to return to the neutral configuration after the driven actuator moves the drive assembly to the shortened configuration. In one or more embodiments, the drive assembly remains in the neutral configuration when the lock element is moved between the locked state and the unlocked state using the manual actuator.

In a second aspect, one or more embodiments of a driven lock system for a fenestration unit as described herein may include: a lock mechanism comprising a lock element movable between a locked state and an unlocked state; a lock actuator assembly comprising a manual actuator operably coupled to the lock element of the lock mechanism, the manual actuator configured to move the lock element between the locked state and the unlocked state; a drive assembly operably connected to the lock element of the lock mechanism, wherein the drive assembly comprises a driven actuator comprising a first end and a second end, wherein the driven actuator is configured to move the drive assembly between an extended configuration, a neutral configuration, and a shortened configuration. Wherein the first end and the second end are located farther away from each other when the drive assembly is in the extended configuration than when the drive assembly is in the neutral configuration; the first end and the second end are located closer to each other when the drive assembly is in the shortened configuration than when the drive assembly is in the neutral configuration; movement of the drive assembly from the neutral configuration to the extended configuration changes the lock element between the locked state and the unlocked stated; and movement of the drive assembly from the neutral configuration to the shortened configuration changes the lock element between the locked state and the unlocked state.

In one or more embodiments of a driven lock system as described herein, a distance between the first end and the second end of the driven actuator remains constant when the lock element is moved between the locked state and the unlocked state using the manual actuator. In one or more embodiments, the driven actuator of the drive assembly moves when the lock element is moved between the locked and unlocked states using the manual actuator.

In one or more embodiments of a driven lock system as described herein, the drive assembly is configured to return to the neutral configuration after the driven actuator moves the drive assembly to the extended configuration.

In one or more embodiments of a driven lock system as described herein, the drive assembly is configured to return to the neutral configuration after the driven actuator moves the drive assembly to the shortened configuration.

In one or more embodiments of a driven lock system as described herein, the lock actuator assembly comprises a slide arm operably coupled to the manual actuator and the lock mechanism, wherein movement of the manual actuator is configured to move the slide arm between a locked position and an unlocked position, wherein the slide arm is in the locked position when the lock element of the lock mechanism is in the locked state, and wherein the slide arm is in the unlocked locked position when the lock element of the lock mechanism is in the unlocked state. In one or more embodiments, the drive assembly is operably coupled to the lock element through the slide arm, wherein movement of the drive assembly from the neutral configuration to the shortened configuration moves the slide arm to the locked position or the unlocked position. In one or more embodiments, the drive assembly is operably coupled to the lock element through the slide arm, wherein movement of the drive assembly from the neutral configuration to the extended configuration moves the slide arm to the locked position or the unlocked position.

In one or more embodiments, the drive assembly comprises a rotating lock link at the first end of the driven actuator, and wherein the driven actuator is operably connected to the slide arm through the rotating lock link. In one or more embodiments, the drive assembly comprises a rotating stop link at the second end of the driven actuator, wherein rotation of the rotating stop link is limited when moving the drive assembly to the extended configuration by a rear stop, and further wherein rotation of the rotating stop link is limited when moving the drive assembly to the shortened configuration by a front stop.

In one or more embodiments of a driven lock system as described herein, the driven actuator comprises a linear actuator.

In one or more embodiments of a driven lock system as described herein, the system comprises a lock mechanism state sensor configured to detect when the lock element is in the locked state. In one or more embodiments, the lock mechanism state sensor is configured to detect when the lock element is in the unlocked state. In one or more embodiments, the lock actuator assembly comprises a slide arm operably coupled to the manual actuator and the lock mechanism, wherein the slide arm is configured to move between a locked position and an unlocked position, wherein the slide arm is in the locked position when the lock element of the lock mechanism is in the locked state, and wherein the slide arm is in the unlocked locked position when the lock element of the lock mechanism is in the unlocked state. In one or more embodiments, the lock mechanism state sensor is configured to determine when the slide arm is in the locked position. In one or more embodiments, the lock mechanism state sensor is configured to determine when the slide arm is in the unlocked position.

In a second aspect, one or more embodiments of a fenestration unit as described herein includes a fenestration unit frame; a movable panel configured for movement in the fenestration unit frame between an open position and a closed position, wherein the movable panel comprises a panel frame member positioned adjacent a fenestration unit frame member when the movable panel is in the closed position; and a driven lock system located in the panel frame member. The driven lock system comprises: a lock mechanism comprising a lock element movable between a locked state and an unlocked state; a lock actuator assembly comprising a manual actuator operably coupled to the lock element of the lock mechanism, the manual actuator configured to move the lock element between the locked state and the unlocked state; a drive assembly operably connected to the lock element of the lock mechanism, wherein the drive assembly comprises a driven actuator comprising a first end and a second end, wherein the driven actuator is configured to move the drive assembly between an extended configuration, a neutral configuration, and a shortened configuration. The first end and the second end are located farther away from each other when the drive assembly is in the extended configuration than when the drive assembly is in the neutral configuration; the first end and the second end are located closer to each other when the drive assembly is in the shortened configuration than when the drive assembly is in the neutral configuration; movement of the drive assembly from the neutral configuration to the extended configuration changes the lock element between the locked state and the unlocked stated; and movement of the drive assembly from the neutral configuration to the shortened configuration changes the lock element between the locked state and the unlocked state.

In one or more embodiments of a fenestration unit as described herein, the drive assembly remains in the neutral configuration when moving the lock element between the locked and unlocked states using the manual actuator.

In one or more embodiments of a fenestration unit as described herein, a distance between the first end and the second end of the driven actuator remains constant when the lock element is moved between the locked state and the unlocked state using the manual actuator. In one or more embodiments, the driven actuator of the drive assembly moves when the lock element is moved between the locked and unlocked states using the manual actuator.

In one or more embodiments of a fenestration unit as described herein, the drive assembly is configured to return to the neutral configuration after the driven actuator moves the drive assembly to the extended configuration.

In one or more embodiments of a fenestration unit as described herein, the drive assembly is configured to return to the neutral configuration after the driven actuator moves the drive assembly to the shortened configuration.

In one or more embodiments of a fenestration unit as described herein, the lock actuator assembly comprises a slide arm operably coupled to the manual actuator and the lock mechanism, wherein movement of the manual actuator is configured to move the slide arm between a locked position and an unlocked position, wherein the slide arm is in the locked position when the lock element of the lock mechanism is in the locked state, and wherein the slide arm is in the unlocked locked position when the lock element of the lock mechanism is in the unlocked state. In one or more embodiments, the drive assembly is operably coupled to the lock element through the slide arm, wherein movement of the drive assembly from the neutral configuration to the shortened configuration moves the slide arm to the locked position or the unlocked position. In one or more embodiments, the drive assembly is operably coupled to the lock element through the slide arm, wherein movement of the drive assembly from the neutral configuration to the extended configuration moves the slide arm to the locked position or the unlocked position. In one or more embodiments, the drive assembly comprises a rotating lock link at the first end of the driven actuator, and wherein the driven actuator is operably connected to the slide arm through the rotating lock link. In one or more embodiments, the drive assembly comprises a rotating stop link at the second end of the driven actuator, wherein rotation of the rotating stop link is limited when moving the drive assembly to the extended configuration by a rear stop, and further wherein rotation of the rotating stop link is limited when moving the drive assembly to the shortened configuration by a front stop.

In one or more embodiments of a fenestration unit as described herein, the driven actuator comprises a linear actuator.

In one or more embodiments of a fenestration unit as described herein, the system comprises a lock mechanism state sensor configured to detect when the lock element is in the locked state. In one or more embodiments, the lock mechanism state sensor is configured to detect when the lock element is in the unlocked state. the lock actuator assembly comprises a slide arm operably coupled to the manual actuator and the lock mechanism, wherein the slide arm is configured to move between a locked position and an unlocked position, wherein the slide arm is in the locked position when the lock element of the lock mechanism is in the locked state, and wherein the slide arm is in the unlocked locked position when the lock element of the lock mechanism is in the unlocked state. In one or more embodiments, the lock mechanism state sensor is configured to determine when the slide arm is in the locked position. In one or more embodiments, the lock mechanism state sensor is configured to determine when the slide arm is in the unlocked position.

In one or more embodiments of a fenestration unit as described herein, wherein the lock element protrudes from an edge of the panel frame member when in the locked state.

In one or more embodiments of a fenestration unit as described herein, the lock element is recessed within an edge of the panel frame member when in the unlocked state.

In one or more embodiments of a fenestration unit as described herein, wherein the fenestration unit comprises a panel electrical connector carried on the panel frame member such that the panel electrical connector moves with the movable panel, wherein the panel electrical connector is operably connected to the driven actuator and, if included, the lock mechanism state sensor; and a unit frame electrical connector carried on the fenestration unit frame member, wherein the panel electrical connector and the unit frame electrical connector are operably connected to each other when the movable panel is in the closed position. In one or more embodiments, the panel electrical connector and the unit frame electrical connector are disconnected from each other when the movable panel is in the open position. In one or more embodiments, the panel electrical connector is located on an edge of the panel frame member.

In one or more embodiments of a fenestration unit as described herein, the driven actuator is connected to a power source only when the movable panel is in the closed position.

In a third aspect, one or more embodiments of a method of operating a lock on a movable panel of a fenestration unit comprises: moving a lock element of a lock mechanism between a locked state and an unlocked state using a manual actuator of a lock actuator assembly operably coupled to the lock element of the lock mechanism; and moving the lock element between locked state and the unlocked state using a driven actuator of a drive assembly operably connected to the lock element, wherein the drive assembly comprises a driven actuator comprising a first end and a second end, wherein the driven actuator is configured to move the drive assembly between an extended configuration, a neutral configuration, and a shortened configuration, wherein the first end and the second end are located farther away from each other when the drive assembly is in the extended configuration than when the drive assembly is in the neutral configuration, wherein the first end and the second end are located closer to each other when the drive assembly is in the shortened configuration than when the drive assembly is in the neutral configuration. Moving the lock element between the locked state and the unlocked state comprises moving the drive assembly from the neutral configuration to the extended configuration; and moving the lock element between the locked state and the unlocked state comprises moving the drive assembly from the neutral configuration to the shortened configuration.

In one or more embodiments of the methods described herein, the drive assembly remains in the neutral configuration when moving the lock element between the locked state and the unlocked state using the manual actuator.

In one or more embodiments of the methods described herein, a distance between the first end and the second of the driven actuator remains constant when moving the lock element between the locked state and the unlocked state using the manual actuator.

In one or more embodiments of the methods described herein, the driven actuator of the drive assembly moves when moving the lock element between the locked and unlocked states using the manual actuator.

In one or more embodiments of the methods described herein, the method comprises returning the drive assembly to the neutral configuration after moving the drive assembly to the extended configuration.

In one or more embodiments of the methods described herein, the method comprises returning the drive assembly to the neutral configuration after moving the drive assembly to the shortened configuration.

In one or more embodiments of the methods described herein, the lock actuator assembly comprises a slide arm operably coupled to the manual actuator and the lock mechanism, wherein moving the manual actuator moves the slide arm between a locked position and an unlocked position, wherein the slide arm is in the locked position when the lock element of the lock mechanism is in the locked state, and wherein the slide arm is in the unlocked locked position when the lock element of the lock mechanism is in the unlocked state. In one or more embodiments, moving the drive assembly from the neutral configuration to the shortened configuration moves the slide arm to the locked position or the unlocked position. In one or more embodiments, moving the drive assembly from the neutral configuration to the extended configuration moves the slide arm to the locked position or the unlocked position.

In one or more embodiments of the methods described herein, the method comprises detecting when the lock element is in the locked state, and wherein the method further comprises moving the drive assembly to the extend configuration or the shortened configuration as needed to move the lock element to the unlocked state. In one or more embodiments, the method comprises detecting when the lock element is in the unlocked state, and wherein the method further comprises moving the drive assembly to the extend configuration or the shortened configuration as needed to move the lock element to the locked state. In one or more embodiments, the lock actuator assembly comprises a slide arm operably coupled to the manual actuator and the lock mechanism, wherein the slide arm is in a locked position when the lock element of the lock mechanism is in the locked state, and wherein the slide arm is in an unlocked locked position when the lock element of the lock mechanism is in the unlocked state; wherein determining when the lock element is in the locked state comprises determining when the slide arm is in the locked position. In one or more embodiments, determining when the lock element is in the unlocked locked state comprises determining when the slide arm is in the unlocked position.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the driven lock systems, fenestration units including the driven lock systems, and methods of operating the driven lock systems described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
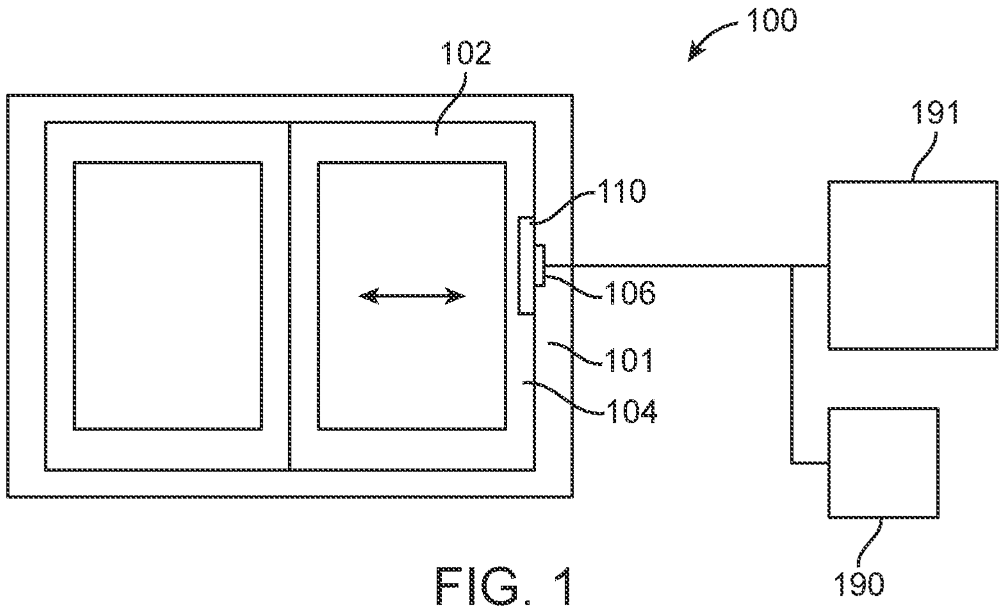
FIG. 1 depicts one illustrative embodiment of a fenestration unit with a movable panel including a driven lock system as described herein in which the movable panel slides within a fenestration unit frame.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The driven lock systems, fenestration units including the driven lock systems, and methods of operating the driven lock systems described herein may be used with a variety of different fenestration units that include movable panels with lock assemblies. Fenestration units in the form of windows may include one or more horizontally sliding panels (i.e., sashes), one or more vertically moving panels (in, e.g., a double hung window, a single hung window, etc.), and/or one or more rotating panels (in, e.g., a casement window, transom, etc.). Fenestration units in the form of doors may include one or more movable panels, the one or more movable panels may include one or more horizontally sliding panels (e.g., patio doors, sliding doors, gliding doors, multi-glide doors, lift and slide doors, etc.), one or more vertically movable door panels, and/or one or more rotating movable panels. The movable panels in fenestration units as described herein slide and/or rotate between closed and open positions within a fenestration unit frame.

One illustrative embodiment of a fenestration unit 100 including a movable panel 102 which is movable within the fenestration unit frame 101 between open and closed positions. In the depicted embodiment, the movable panel 102 is in a closed position with one illustrative embodiment of a driven lock system 110 as described herein located in a panel frame member 104 of the movable panel 102. A corresponding lock receiver 106 is located in the fenestration unit frame member against which panel frame member 104 is positioned when the movable panel 102 is in the closed position.

The lock receiver 106 may, in one or more embodiments, include connections as will be described herein such that power may be provided to the driven lock system 110 when the movable panel 102 is in its closed position. In particular, in one or more embodiments a power source 191 may be connected to the driven lock system 110 through receiver 106 when the movable panel 102 is in its closed position. In one or more embodiments, the receiver 106 may also serve as connections for a control unit 190 to provide control signals to the driven lock system 110 and/or receive control signals from the driven lock system 110.

Figure 2:
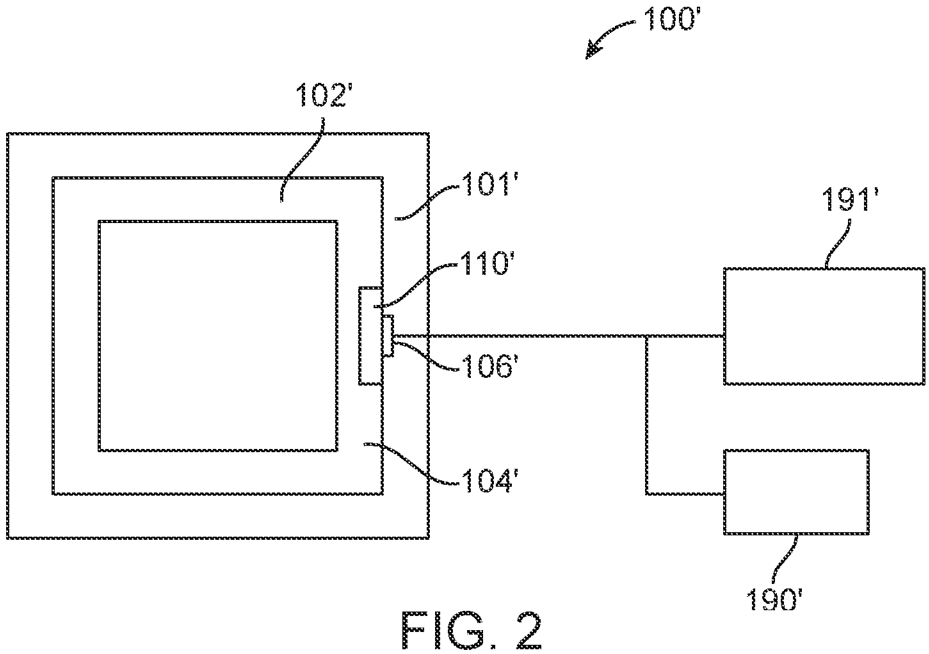
FIG. 2 depicts another illustrative embodiment of a fenestration unit with a movable panel including a driven lock system as described herein in which the movable panel rotates within a fenestration unit frame.
Figure 3:
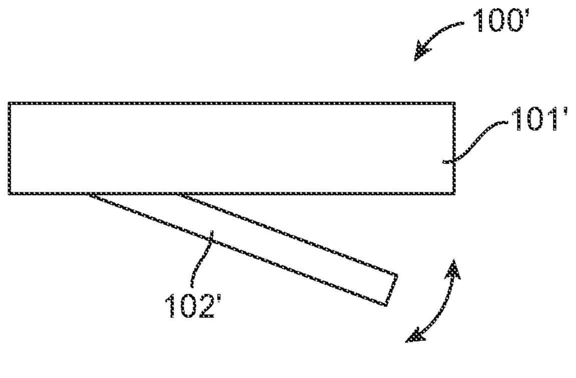
FIG. 3 is a view of the fenestration unit of FIG. 2 after rotation of the movable panel into an open position.

Another illustrative embodiment of a fenestration unit 100' is depicted in FIGS. 2 and 3. The fenestration unit 100' includes a movable panel 102' that rotates into and out of a closed position within the fenestration unit frame 101', with the movable panel 102' being depicted in an open position in FIG. 3. The movable panel 102' includes a driven lock system 110' as described herein located in a panel frame member 104' of the movable panel 102'. A corresponding lock receiver 106' is located in the fenestration unit frame member against which panel frame member 104' is positioned when the movable panel 102' is in the closed position.

As discussed in connection with fenestration unit 100, fenestration unit 100' also includes a lock receiver 106' that may, in one or more embodiments, include connections for power of the driven lock system 110' when, for example, the movable panel 102' is in its closed position. In particular, in one or more embodiments, a power source 191' may be connected to the driven lock system 110' through receiver 106' when the movable panel 102' is in its closed position. In one or more embodiments, the receiver 106' may also serve as connections for a control unit 190' to provide control signals to the driven lock system 110' and/or receive control signals from the driven lock system 110'.

Figure 4:
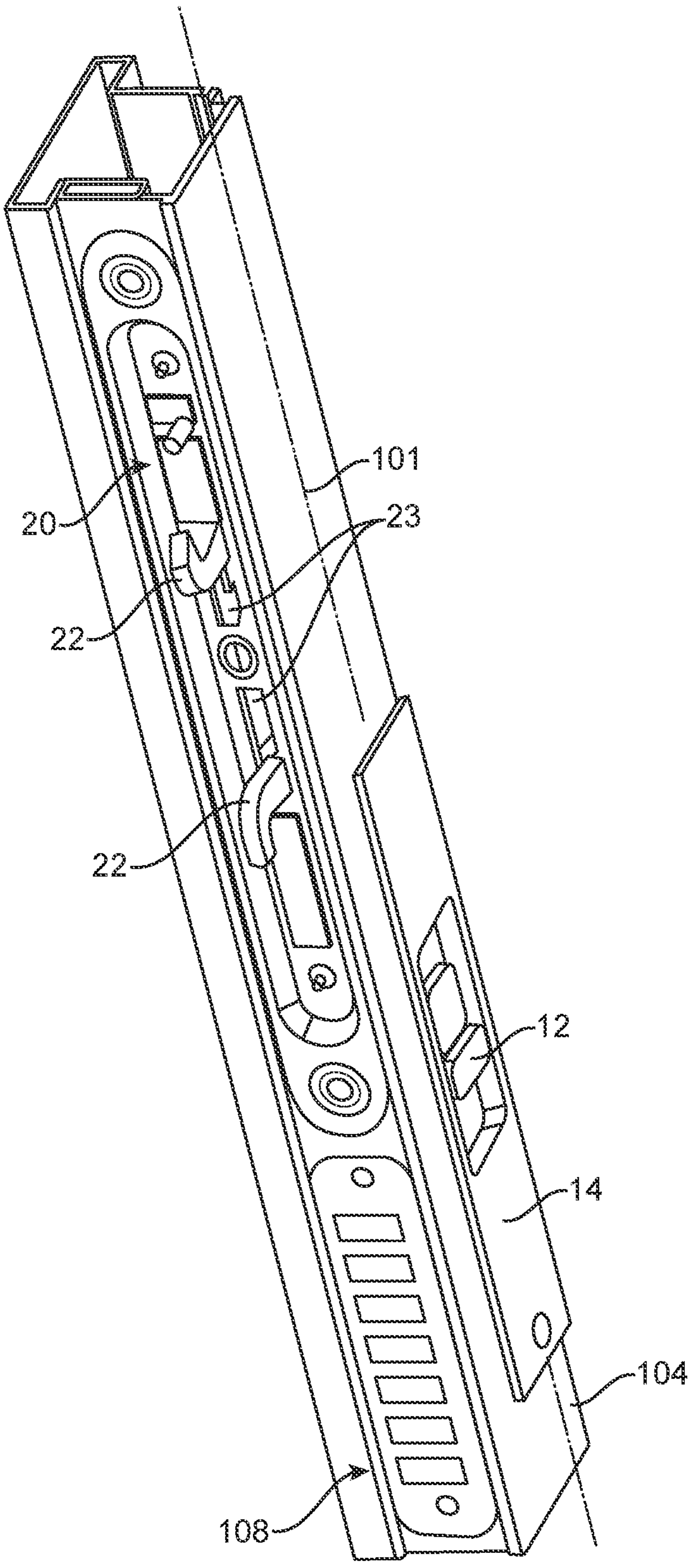
FIG. 4 is a perspective view of a portion of a panel frame member of one illustrative embodiment a movable panel including one illustrative embodiment of a driven lock system as described herein.
Figure 5:
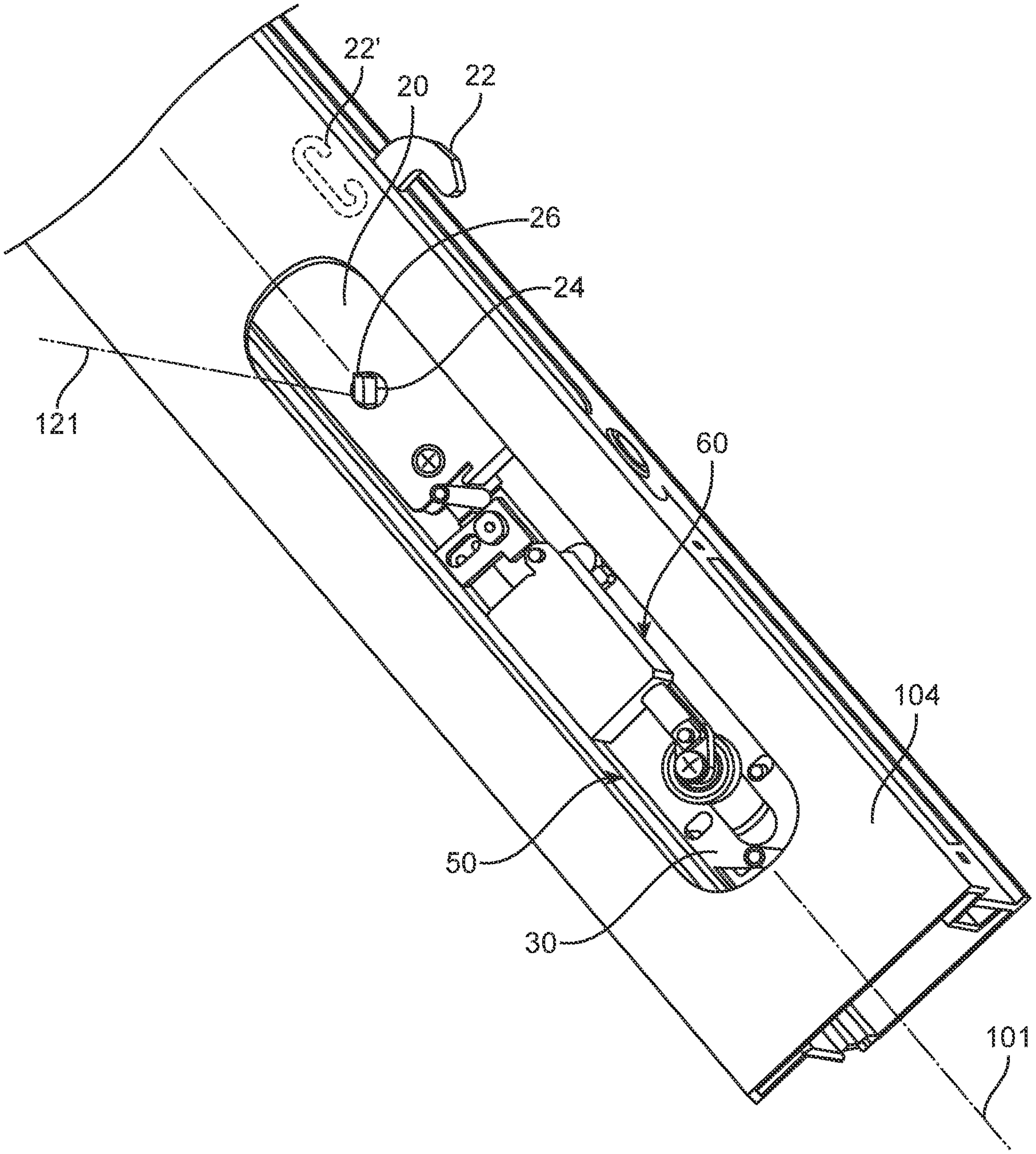
FIG. 5 is an opposite side perspective view of the panel frame member of FIG. 4 with a portion of the panel member frame cut away to expose a portion of the driven lock system contained within the panel frame member.

One illustrative embodiment of a driven lock system as described herein is depicted in FIGS. 4 and 5 within a panel frame member 104 of a movable panel of a fenestration unit as described herein. A portion of the panel frame member 104 is removed to expose components of the driven lock system located within panel frame member 104 in FIG. 5 because, when installed within a panel frame member as depicted in FIG. 4, many components of the illustrative embodiment of the depicted driven lock system are not visible.

Among those components that are depicted in FIG. 4 is a manual actuator 12 mounted in an escutcheon plate 14 on one surface of the panel frame member 104. Also visible in the view depicted in FIG. 4 are lock elements 22 of a lock mechanism 20 located within the panel frame member 104. Further, a panel electrical connector 108 is also depicted on panel frame member 104.

The depicted manual actuator 12 is in the form of a slide that moves in a linear direction along, e.g., axis 101 when moving the lock between a locked and unlocked state. In one or more alternative embodiments, manual actuators used in connection with driven lock systems as described herein may take any suitable form, e.g., rotating knobs, rotating levers, push actuators, pull actuators, etc. the depicted manual actuator 12 in the form of a slide may provide a reduced profile or width as compared with many other manual actuators that could be mounted on the panel frame member 104 for use with a driven lock system as described herein.

The depicted lock mechanism 20 is a multipoint lock mechanism which may, as depicted in FIGS. 4 and 5, be in the form of a mortise lock mechanism located within a mortise in the panel frame member 104, although lock mechanisms used in one or more embodiments of driven lock systems as described herein may or may not be mortise lock mechanisms.

The depicted lock mechanism 20 includes a pair of lock elements 22 in the form of hooks/deadbolts that selectively extend from or retract into the lock mechanism 20 through openings 23 to move the lock mechanism between its locked and unlocked states. The depicted illustrative embodiment of lock mechanism 20 includes an actuating control having a slot 24 configured to receive a drive tail or tung 26 such that the actuating control can be rotated about lock mechanism axis 121 using the drive tail 26 to move the lock elements 22 between their locked and unlocked states. Drive tail 26 is, as described herein, operably connected with the manual actuator and the drive assembly as described herein for rotation needed to move the lock elements 22 between their locked and unlocked states. Such features and mechanisms are well known in lock mechanisms and will not be described in more detail herein.

A complementary keeper may be provided in the lock receiver (see, e.g., lock receiver 106 or 106' in FIGS. 1 and 2 described above), with the lock elements 22 engaging the keeper or keepers to prevent opening of a movable panel of a fenestration unit as described herein. Although the depicted lock mechanism 20 is a multipoint lock mechanism, lock mechanisms used in one or more alternative embodiments of driven lock systems as described herein may include only a single lock element or three or more lock elements as needed or desired.

The depicted illustrative embodiment of lock elements 22 of lock mechanism 20 are in a locked state when extended from the lock mechanism as depicted in, e.g., FIGS. 4 and 5, and in an unlocked state when retracted within the lock mechanism 20. In one or more embodiments, the lock elements 22 may rotate into and out of their extended and retracted positions, with one of the lock elements 22 being depicted in a retracted position 22' in FIG. 5 (in broken lines). Alternatively, the lock elements of lock mechanisms used in one or more embodiments of driven lock systems as described herein may translate between their locked and unlocked states or the lock elements may both translate and rotate between their locked and unlocked states. Further, one or more embodiments of lock mechanisms used in driven lock systems as described herein may remain completely within the boundaries of a panel frame member when moving between their locked and unlocked states, i.e., extension of lock elements out of a lock mechanism as depicted in the illustrative embodiment of FIGS. 4 and 5 is not required.

The depicted illustrative embodiment of panel electrical connector 108 as seen in FIG. 4 may take a variety of different forms. In the depicted embodiment, the panel electrical connector 108 includes multiple contacts each of which may provide one or more different pathways for power and/or control signals. In particular, control signals may be provided to components of the driven lock system through the contacts of panel electrical connector 108 and/or control signals may be received from components of the driven lock system through the contacts of panel electrical connector 108.

Although the depicted panel electrical connector 108 includes contacts in the form of contact pads, one or more alternative embodiments of driven lock systems as described herein may include electrical connectors in any suitable form including, e.g., pins, blades, sockets, slots, etc. Regardless of the particular form of the contacts of a panel electrical connector 108 used in one or more embodiments of a driven lock system as described herein, the contacts of the panel electrical connector should be compatible with the complementary connector provided on the fenestration unit frame in, e.g., lock receiver 106 or any other structure provided to make contact with the panel electrical connector 108.

Figure 6:
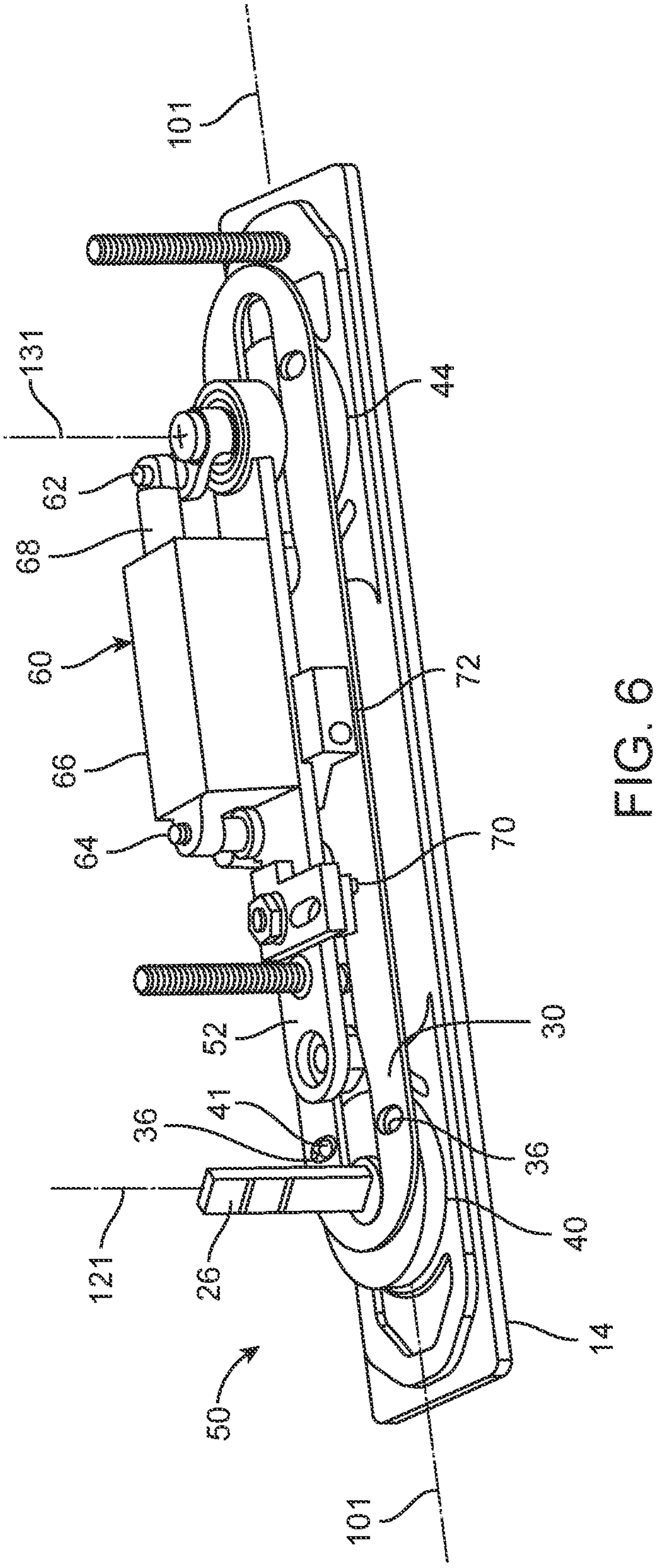
FIG. 6 is a perspective view of one illustrative embodiment of a lock actuator assembly and one illustrative embodiment of a drive assembly of one illustrative embodiment of a driven lock system as described herein.

Also depicted in the view of FIG. 5 are portions of the lock actuator assembly 50 as well as the drive assembly 60. These components of the depicted illustrative embodiment of a driven lock system as described herein are depicted in FIG. 6 after removal from the panel frame member 104 and the lock mechanism 20. In particular, the lock actuator assembly 50 includes the escutcheon plate 14 in which the manual actuator 12 (as seen in, e.g., FIG. 4) is located. The manual actuator 12 is not depicted in FIG. 6 because it is on the opposite side of the escutcheon plate 14.

Other components of the illustrative embodiment of the lock actuator assembly 50 include a slide arm 30 along with drive discs 40 and 44. Drive disc 40 includes a boss 42 that protrudes from drive disc 40, while drive disk 44 includes a boss 46 that protrudes from drive disc 44. Slide arm 30 includes slot 32 that receives boss 42 of drive disc 40, while slot 34 of slide arm 30 receives boss 46 of drive disc 44. Translational movement of slide arm 30 along axis 101 is constrained by interaction between slots 32 and 34 and bosses 42 and 46 as well as, in the depicted illustrative embodiment, fasteners 43 and 47 which assist in retaining the slide arm 30 in position with the drive discs 40 and 44, as well as escutcheon plate 14. Further details of the constructions and interactions of the depicted illustrative embodiment of escutcheon plate 14, slide arm 30 and drive discs 40 and 44 may be found in U.S. Pat. No. 9,482,035 (Wolf).

The drive disc 40 is operably connected to drive tail 26 which, as seen in FIG. 5, is operably connected with the lock mechanism 20 such that rotation of the drive disc 40 rotates drive tail 26 about the lock mechanism axis 121 to move the lock elements 22 between their locked and unlocked states.

Figure 7:
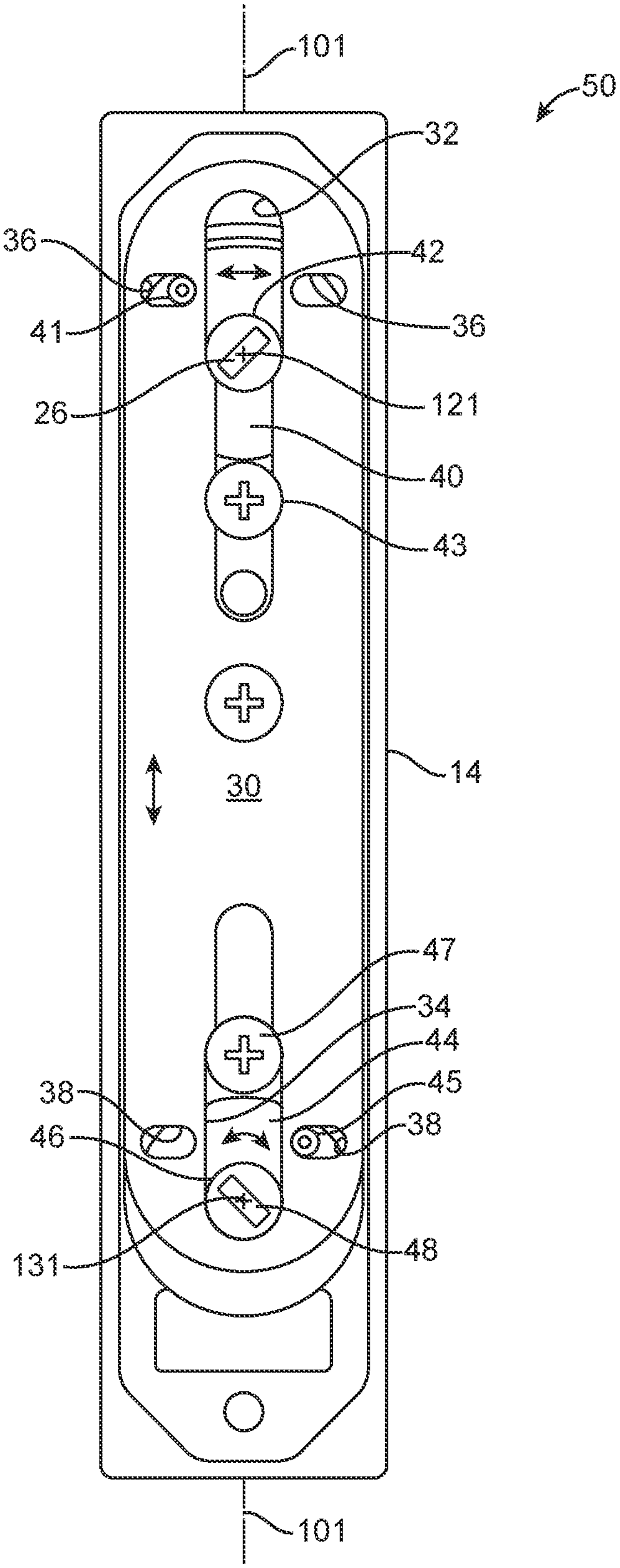
FIG. 7 depicts the lock actuator assembly of FIG. 6 after removal of the drive assembly.

With reference to both FIGS. 6 and 7, translational movement of slide arm 30 is converted to rotary motion using a pin and slot arrangement which operably connects the slide arm 30 with the drive disc 40. FIG. 7 depicts the lock actuator assembly 50 after removal of the drive assembly 60 to allow for viewing of additional features on lock actuator assembly 50.

Rotation of the drive disc 40 about lock mechanism axis 121 is, in the depicted illustrative embodiment caused by translational movement of the slide arm 30 along axis 101. In particular, drive disc 40 includes a pin 41, while slide arm 30 includes a slot 36 in which pin 41 is located. Movement of the slide arm 30 to the left in the view of FIG. 6 causes slot 36 two engage pin 41 causing drive disc 40 to rotate about lock mechanism axis 121. Slide arm 30 is, in the depicted embodiment, operably connected to the manual actuator 12 which, when moved in translation along axis 101, causes slide arm 30 to also move in translation along that axis. Details with respect to the connection of the slide arm 30 to manual actuator 12 such that translational movement of the manual actuator 12 causes corresponding translational movement of the slide arm 30 can be found in U.S. Pat. No. 9,482,035 (Wolf).

As depicted in both FIGS. 6 and 7, slide arm 30 includes a pair of slots into which a pin on drive disc 40 may be received to convert translational movement of the slide arm 30 to rotational movement of the drive tail 26. It should be noted that the pin 41 as seen in FIGS. 6 and 7 is located in the opposing slots 36 on slide arm 30. The two opposing slots 36 are provided for universality such that the slide arm and associated lock actuator assembly 50 can be used in either a right or left-handed configuration as needed.

Another difference between FIGS. 6 and 7 is that the location of the pin 41 is also changed between FIGS. 6 and 7. In particular, pin 41 is located closer to drive disc 44 in FIG. 6, while pin 41 is located further away from drive disc 44 in FIG. 7. That difference is caused by movement of the slide arm 30 from its position as seen in FIG. 6 to its position as seen in FIG. 7. In particular, slide arm 30 causes movement of pin 41 and corresponding rotation of drive disc 40 as the slide arm 30 is moved to the left along axis 101 from its position in FIG. 6 to its position in FIG. 7.

In one or more embodiments of driven lock systems as described herein, a lock actuator assembly including a slide arm 30 may be described as moving between a locked position and an unlocked position. The slide arm 30 may, in one or more embodiments, be in its locked position when the lock elements 22 of the lock mechanism 20 are in their locked state. Similarly, the slide arm 30 may, in one or more embodiments, be in its unlocked position when the lock elements 22 of the lock mechanism 20 are in their unlocked state. For example, the slide arm 30 as depicted in FIG. 6 may be described as being in its unlocked position while the slide arm 30 as seen in FIG. 7 is in its locked position or vice versa, i.e., the slide arm 30 as depicted in FIG. 6 may be described as being in its locked position while the slide arm 30 as seen in FIG. 7 is in its unlocked position.

One or more embodiments of driven lock systems as described herein may also include a lock mechanism state sensor that is configured to detect when the lock element or elements of a driven lock system are in the locked or unlocked state. Detection of the locked or unlocked state of the lock mechanism can be used during control of the drive assembly.

In the illustrative embodiment of the driven lock system as depicted in FIG. 6, the lock mechanism state sensor may be provided by components provided on the slide arm 30. In particular, the depicted embodiment of lock mechanism state sensor includes components configured to determine the position of the slide arm 30 which, as described herein, can be moved from a locked position to an unlocked position where the locked position and the unlocked position correspond with the locked state and unlocked state, respectively, of the lock elements of the driven lock system. The depicted lock mechanism state sensor includes a sensor 70 and trigger 72 where the trigger 72 moves towards and away from the sensor 70 as the slide arm 30 moves between its locked and unlocked positions.

The sensor 70 and trigger 72 may take any form capable of detecting when the selected components of the driven lock system indicate that the lock element is in its locked state and/or its unlocked state. Although the illustrative embodiment of the lock mechanism status sensor depicted in FIG. 6 may be in the form of a magnetic switch that is configured to sense a trigger in the form of a permanent magnet, the lock mechanism status sensors used in connection with the driven lock systems described herein may be provided in any suitable form that may or may not require a separate trigger to detect the position of a component, e.g., an electro-mechanical switch (e.g., microswitch, etc.), an acoustical sensor, an RFID device, an optical sensor, a capacitive sensor, direct electrical contacts (e.g., in which one or more components of the driven lock system span a pair of contacts to complete a circuit), etc.

As discussed herein, the lock mechanism state sensor may be operably coupled to a control unit provided as a part of the drive assembly 60, provided as a part of the sensor 70 itself, or is located remote from both the drive assembly and the sensor, e.g., a control unit located elsewhere on the movable panel (e.g., on the lock actuator assembly, in the lock mechanism, elsewhere in the panel frame, etc.), on or in the fenestration unit frame, or elsewhere.

The depicted illustrative embodiment of the drive assembly 60 as depicted in FIG. 6 includes a driven actuator 66 that is configured to move the drive assembly 60 between an extended configuration, a neutral configuration, and a shortened configuration. In one or more embodiments, the drive assembly 60 is operably connected to the lock elements 22 of the lock mechanism 20 such that movement of the drive assembly between its various configurations can be used to move the lock elements 22 between their locked and unlocked states. In particular, the drive assembly 60 may include a first end 62 and a second end 64, with the driven actuator 66 being used to change the distance between the first end 62 and the second end 64. Those changes in distance correspond to the extended configuration, the neutral configuration and the shortened configuration as discussed herein.

The driven actuator 66 used in the drive assemblies of driven lock systems as described herein may take a variety of different forms. Examples of potentially suitable linear actuators that may be used to change the distance between two points such as, e.g., the first end 62 and the second end 64 include but are not limited to: electric motor driven linear actuators (with or without gearboxes), solenoids, piezo electric actuators, magnetic actuators, pneumatic actuators, hydraulic actuators, etc.

Figure 8:
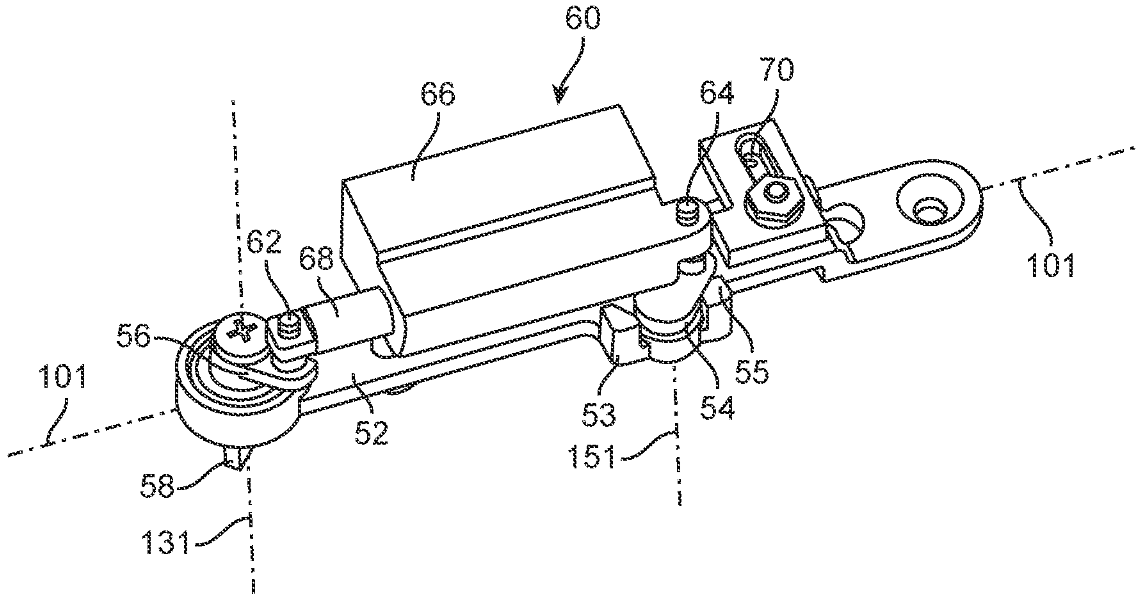
FIG. 8 is a perspective view of the drive assembly of FIG. 6.
Figure 9:
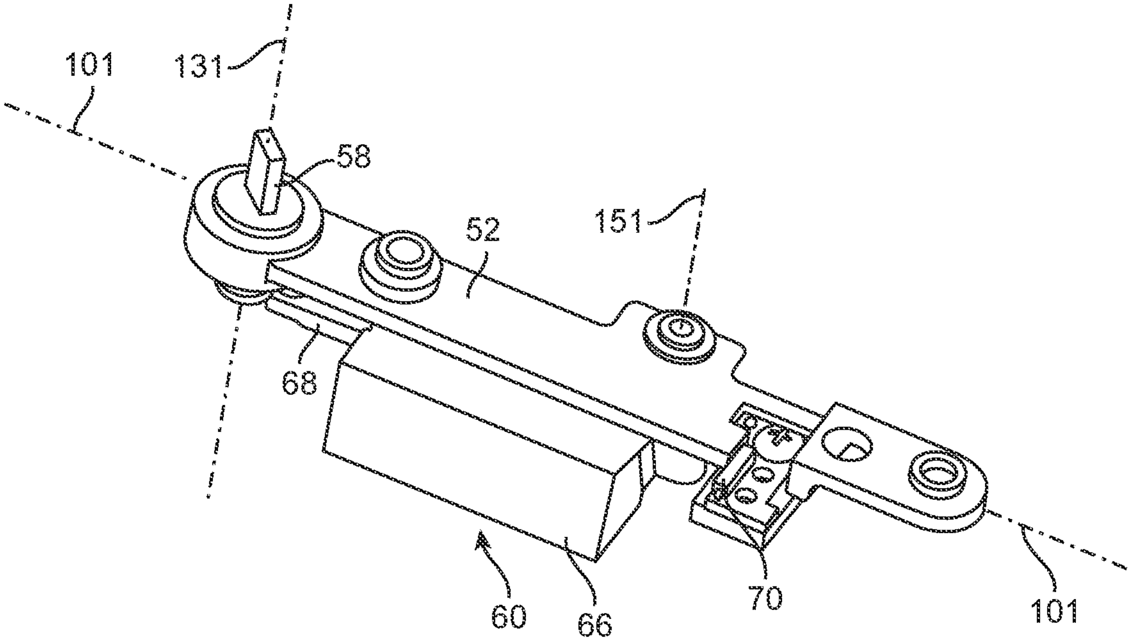
FIG. 9 is an opposite side perspective view of the drive assembly as depicted in FIG. 8.

The illustrative embodiment of drive assembly 60 is depicted in FIGS. 8 and 9 after being removed from the lock actuator assembly 50. The illustrative embodiment of drive assembly 60 as depicted in those figures includes a driven actuator 66 that defines a driven actuator distance between the first end 62 and a second end 64. The driven actuator distance between the first end 62 and the second end 64 changes based on movement of arm 68 of the illustrative embodiment of driven actuator 66. In particular, arm 68 may either extend farther from the housing to increase the distance between the first end 62 and the second end 64, or the arm 68 may retract into the housing of the depicted illustrative embodiment of driven actuator 66 to reduce the distance between the first end 62 and the second end 64.

The driven actuator 66 is provided on a drive assembly plate 52 that, as depicted in, e.g., FIG. 6, is mounted on the lock actuator assembly 50. In the depicted illustrative embodiment, the drive assembly plate 52 also carries the position sensor 70, although other arrangements for mounting of the position sensor 70 may be provided in alternative embodiments of driven lock systems as described herein. One potential benefit of mounting position sensor 70 on the depicted embodiment of drive assembly plate 52 is that drive assembly plate 52 remains stationary relative to the escutcheon plate 14 along which slide arm 30 moves in translation as discussed herein.

The depicted illustrative embodiment of driven lock system for a fenestration unit includes a drive assembly 60 that is operably coupled to a rotating lock link 56 attached to the first end of the driven actuator 66. The rotating lock link 56 rotates about axis 131 and is, itself, operably attached to drive tail 58 which also rotates about axis 131 when rotating lock link 56 rotates. The depicted illustrative embodiment of drive assembly 60 also includes a rotating stop link 54 attached to the second end 64 of the driven actuator 66. Rotating stop link 54 rotates about axis 151 at a fixed location on the drive assembly plate 52.

As discussed herein, the drive assemblies of driven lock systems as described herein can be used to move the lock elements between their locked and unlocked states. In the depicted illustrative embodiment of drive assembly 60, increasing or decreasing the distance between the first end 62 and the second end 64 of the driven actuator 66 can cause rotating link 56 two rotate about axis 131. As noted above, rotation of lock link 56 causes corresponding rotation of drive tail 58 which moves the lock element of an attached lock mechanism between its locked and unlocked states.

Referring back to FIGS. 6 and 7, the depicted illustrative embodiment of drive assembly 60 is operably connected to the slide arm 30 of lock actuator assembly 50 through drive tail 58. In particular, drive tail 58 is received in drive tail slot 48 (see, e.g., FIG. 7) of drive disc 44 of the depicted illustrative embodiment of lock actuator assembly 50. As a result, rotation of drive tail 58 about axis 131 causes corresponding rotation of drive disc 44 about that axis.

Rotation of the drive tail 58 and drive disc 44 about axis 131 is converted to translational movement of slide arm 30 along axis 101 using a pin and slot arrangement that operably connects the drive disc 44 with the slide arm 30. In particular, drive disc 44 includes a pin 45, while slide arm 30 includes a slot 38 in which pin 45 is located. Rotation of the drive disc 44 about axis 131 causes slide arm 30 to move along axis 101. In particular, clockwise rotation of drive disc 44 about axis 131 in FIG. 7 will cause slide arm 30 to move downward as depicted in that view which corresponds to the position of slide arm 30 as depicted in FIG. 6. Correspondingly, counterclockwise rotation of drive disc 44 after such clockwise rotation will result in a return of the slide arm 30 to its position as seen in FIG. 7.

The above discussion describes the interaction between drive disc 44 and slide arm 30 during actuation by the drive assembly 60. Interaction between the drive disc 44 and the slide arm 30 may also be caused by the manual actuator 12 which, in the depicted embodiment, is operably connected to slide arm 30. Movement of the slide arm 30 in translation along axis 101 using the manual actuator 12 will also cause drive disc 44 to rotate about axis 131. Details with respect to the connection of the slide arm 30 to manual actuator 12 such that translational movement of the manual actuator 12 causes corresponding translational movement of the slide arm 30 can be found in U.S. Pat. No. 9,482,035 (Wolf).

As depicted in both FIG. 7, slide arm 30 includes a pair of slots 38 into which pin 45 on drive disc 44 may be received to convert translational movement of the slide arm 30 to rotational movement of the drive tail 58 and its attached rotating lock link 56 about axis 131. The two opposing slots 38 are provided for universality such that the slide arm 30 and associated lock actuator assembly 50 can be used in either a right or left-handed configuration as needed.

The interaction between drive tail 58 and rotating lock link 56 with drive disc 44 moves the slide arm 30 of the depicted illustrative embodiment of lock actuator assembly 50 between its locked position and unlocked position. As a result, rotation of the rotating lock link 56 by the driven actuator 66 of drive assembly 60 can be used to move the slide arm 30 between its locked position and unlocked position. As discussed herein, the slide arm 30 can, through drive disc 40, move lock elements 22 of the lock mechanism 20 between their locked and unlocked states. It is through this series of connections that the depicted illustrative embodiment of drive assembly 60 can be used to move the lock elements of lock mechanisms of the depicted illustrative embodiment of the driven lock system between its locked and unlocked states.

Another optional feature of one or more embodiments of drive assemblies used in connection with driven lock systems as described herein is the rotating stop link 54 connected to the second end 64 of the driven actuator 66 of the drive assembly 60. Rotating stop link 54 is rotationally connected to the second end 64 of the driven actuator 66 and is also rotationally connected to the drive assembly base plate 52 such that rotating stop link 54 rotates about axis 151.

As will be discussed in more detail elsewhere herein, driven actuator 66, including its first end 62 and second end 64 are moved during manual operation of the lock actuator assembly to which the drive assembly 60 is attached. As a result, both the first end 62 and second end 64 of the driven actuator must move during manual operation. Rotating stop link 54 provides one mechanism to accommodate movement of the second end 64 of driven actuator 66 of drive assembly 60. Movement of the second end 64 of the driven actuator 66 cannot, however, be unlimited. Rather, the second end 64 of the driven actuator 66 must be constrained for movement between two positions such that the driven actuator 66 can exert the forces necessary to move the lock elements between their locked and unlocked states as the drive assembly is moved from its neutral configuration to its extended configuration or its shortened configuration.

In the depicted illustrative embodiment in which second end 64 of driven actuator 66 is attached to base plate 52 using rotating stop link 54, base plate 52 also includes a front stop 53 and a rear stop 55 that constrain rotation of the rotating stop link 54 between a forward position in which the rotating stop link 54 meets the front stop 53 and a rearward position in which the rotating stop link 54 meets the rear stop 55 (as seen in, e.g., FIG. 8).

Although a rotating stop link and associated stops are depicted in connection with the driven actuator 66, many other structures that provide for movement of the second end 64 of the driven actuator 66 between forward and rearward positions could be used in place of the rotating stop link and associated stops used in the depicted illustrative embodiment. For example, second end 64 could be operably connected to base plate 52 using a slot and pin arrangement or any other suitable mechanical structures. Use of a rotating stop link and associated stops may, however, provide advantages such as limiting potential binding which could increase the forces necessary to move the driven lock system between its locked and unlocked states as well as providing a more robust long-lasting mechanical system by relying on rotation rather than translational movement.

The effect on a drive assembly of one or more embodiments of a driven lock system during use of a manual actuator of a lock actuator assembly of the driven lock system to move lock elements between their locked and unlocked states can be described in connection with FIGS. 10 and 11. In particular, drive assembly 60, in its neutral configuration, is shown in both the forward and rearward positions that correspond to the locked and unlocked states of the associated lock mechanism of the driven lock system.

As discussed herein, the drive assemblies used in driven lock systems as described herein may be particularly advantageous because manual operation of the lock system to lock or unlock a movable panel does not, in one or more embodiments, change the distance between the first end and the second end of the drive assembly. In other words, the drive assemblies of driven lock systems as described herein may essentially function as a fixed length link or other mechanical component that also preferably does not appreciably add to the force required to manually move the lock system between its locked and unlocked states.

Figure 10:
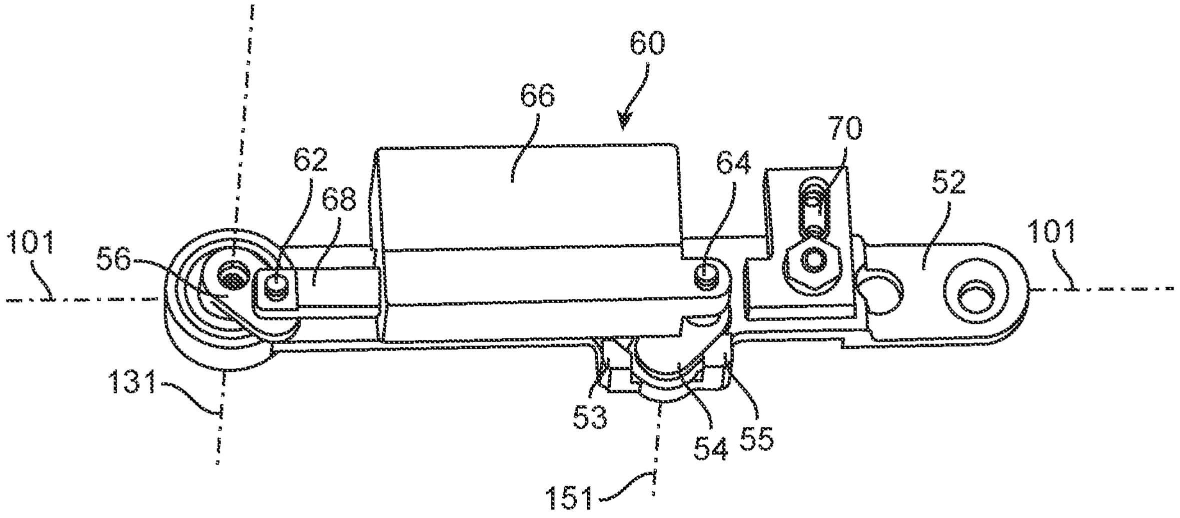
FIG. 10 depicts a neutral configuration of the drive assembly of FIGS. 8 and 9 in a locked or unlocked position.

With reference to FIG. 10, the drive assembly 60 is shown in its rearward position in which rotating stop link 54 bears against rear stop 55 of drive assembly base plate 52. In that position, rotating lock link 56 is also rotated towards the rear stop 55 of the drive assembly plate 52. FIG. 11 depicts the drive assembly 60 in its forward position in which the rotating stop link 54 bears against the front stop 53 on the drive assembly base plate 52. With the driven actuator 66 move forward, rotating lock link 56 is also rotated away from the rear stop 55 of the drive assembly plate with that rotation occurring around axis 131.

Figure 11:
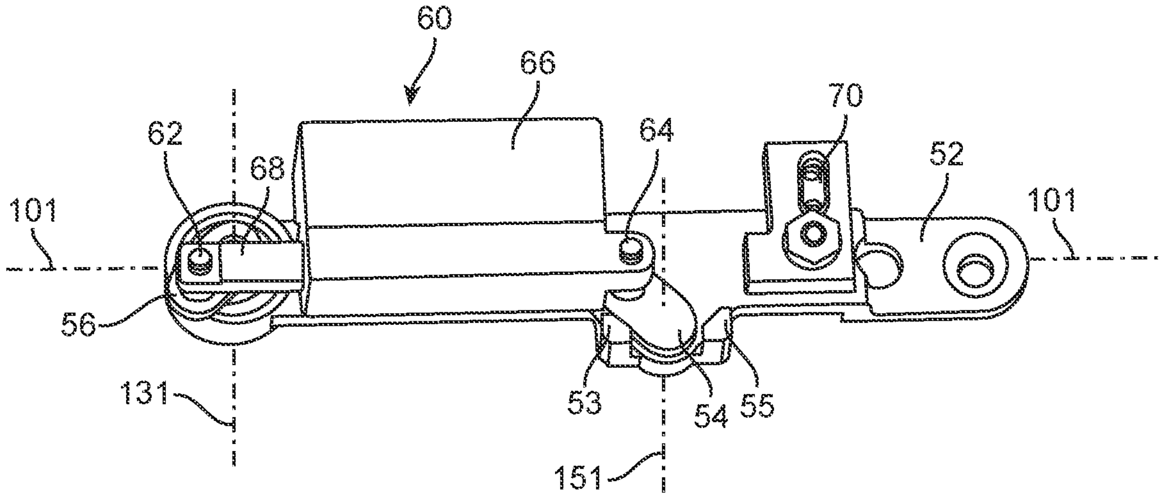
FIG. 11 depicts the drive assembly after movement to the other position in its neutral configuration as a result of manual operation of the lock assembly.

Movement of the drive assembly 60 as shown between the two positions depicted in FIGS. 10 and 11 while the drive assembly 60 remains in its neutral configuration can, in one or more embodiments, be caused by use of the manual actuator of lock actuator assembly to move the lock elements between their locked and unlocked states. The distance between the first end 62 and second end 64 of the driven actuator 66 does not change because the drive assembly 60 remains in its neutral configuration. As a result, the driven actuator 66 of the drive assembly 60 moves between its two positions as depicted in FIGS. 10 and 11 when the lock elements of a lock mechanism of a driven lock system as described herein are moved between their locked and unlocked states using the manual actuator of the lock actuator assembly.

Movement of the drive actuator 66 as shown between the two positions depicted in FIGS. 10 and 11 is, in the depicted illustrative embodiment, caused by rotation of the drive disc 44 of lock actuator assembly 50 due to translational movement of the slide arm 30 caused by manual actuator 12 as described herein. In particular, as manual actuator 12 moves and causes slide arm 30 to move along axis 101 as discussed herein, drive disc 44 is rotated about axis 131. Rotation of drive disc 44 about axis 131 causes drive tail 58 which is operably connected to rotating lock link 56 to also rotate about axis 131. Rotation of lock link 56 causes movement of first end 62 of drive actuator 66 between the two positions depicted in FIGS. 10 and 11.

Figure 12:
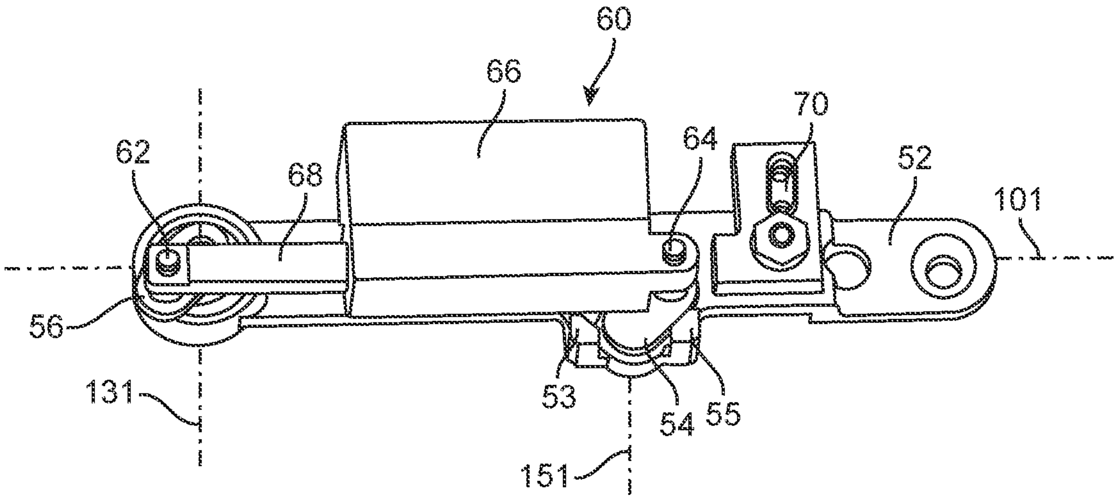
FIG. 12 depicts the drive assembly of FIG. 10 in a shortened configuration after actuation of the driven actuator of the drive assembly.
Figure 13:
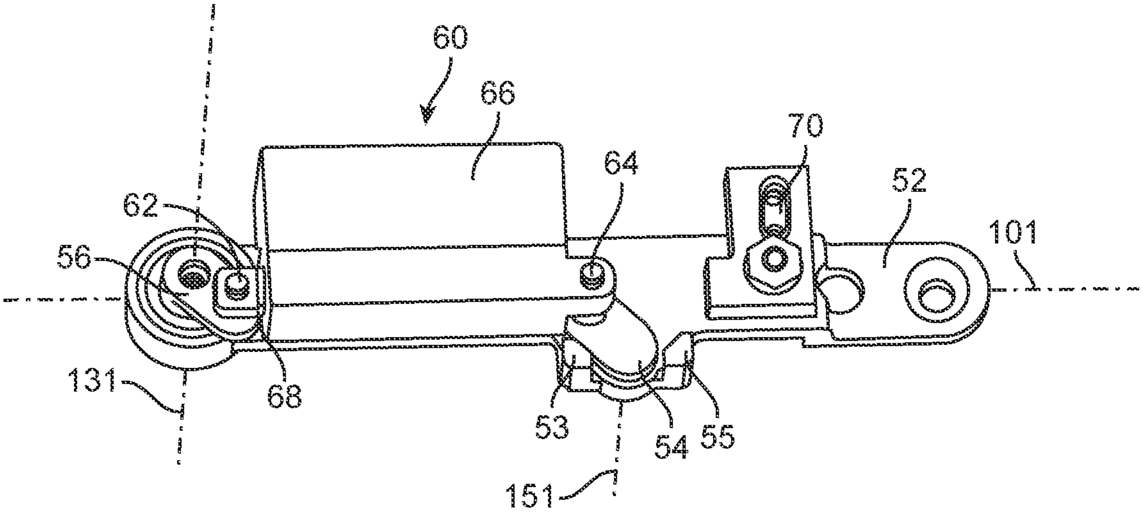
FIG. 13 depicts the drive assembly of FIG. 11 in an extended configuration after actuation of the driven actuator of the drive assembly.

With the effects of manual operation of the driven lock system on the depicted illustrative embodiment of drive assembly 60 discussed, FIGS. 12 and 13 are provided to illustrate driven operation of one or more embodiments of the driven lock systems described herein using the drive assembly 60.

FIG. 12 depicts the drive assembly 60 in its extended configuration, while FIG. 13 depicts the drive assembly 60 in its shortened configuration. As discussed herein, the first end 62 and second end 64 of the driven actuator 66 are located farther away from each other when the drive assembly 60 is in its extended configuration as depicted in FIG. 12 than when the drive assembly 60 is in its neutral configuration as depicted in, e.g., FIG. 10.

Movement of the depicted illustrative embodiment of drive assembly 60 from its neutral configuration as seen in FIG. 10 to its extended configuration as seen in FIG. 12 can be used to change the lock element between its locked and unlocked states. In particular, extension of arm 68 of driven actuator 66 to increase the distance between the first end 62 and the second end 64 of the driven actuator causes rotating lock link 56 to rotate about axis 131. As discussed herein, rotating lock link 56 is operably connected to drive disc 44 (see, e.g., FIGS. 6 and 7) using drive tail 58. As a result, drive disc 44 also rotates about axis 131 which causes slide arm 30 to move in translation. Movement of slide arm 30, in turn, causes drive disc 40 to rotate about axis 121 which causes lock elements 22 of the lock mechanism 20 to move between their locked and unlocked states as discussed herein.

The depicted illustrative embodiment of drive assembly 60 is capable of forcing rotation of the rotating lock link 56 and drive disc 44 to cause slide arm 30 to move along axis 101 which, in turn, causes rotation of drive disc 40 to move the lock elements 22 of lock mechanism 20 between their locked and unlocked states because the second end 64 of the driven actuator 66 is constrained from further rearward movement (i.e. movement away from axis 131) by rear stop 54. As a result, forces generated by the driven actuator 66 when moving to its extended configuration as seen in FIG. 12 can be transferred to rotating lock link 56 for operation of the driven lock system as described herein.

FIG. 13 depicts the drive assembly 60 in its shortened configuration and movement of the depicted illustrative embodiment of drive assembly 60 from its neutral configuration as seen in FIG. 11 to its extended configuration as seen in FIG. 13 can be used to change the lock elements of the depicted illustrative embodiment of driven lock system between their locked and unlocked states. In particular, retraction of arm 68 of driven actuator 66 to decrease the distance between the first end 62 and the second end 64 of the driven actuator 66 causes rotating lock link 56 to rotate about axis 131. As discussed herein, rotating lock link 56 is operably connected to drive disc 44 (see, e.g., FIGS. 6 and 7 using drive tail 58. As a result, drive disc 44 also rotates about axis 131, which causes slide arm 30 to move in translation. Movement of slide arm 30, in turn, causes drive disc 40 to rotate about axis 121, which causes lock elements 22 of the lock mechanism 20 to move between their locked and unlocked states as discussed herein.

The depicted illustrative embodiment of drive assembly 60 is capable of forcing rotation of the rotating lock link 56 and drive disc 44 to cause slide arm 30 to move along axis 101 which, in turn, causes rotation of drive disc 42 move lock elements 22 of lock mechanism 20 between their locked and unlocked states because the second end 64 of the driven actuator 66 is constrained from further forward movement (i.e. movement toward the axis 131) by front stop 53. As a result, forces generated by the driven actuator 66 when moving to its shortened configuration as seen in FIG. 13 can be transferred to rotating lock link 56 for operation of the driven lock system as described herein As discussed herein, one or more embodiments of drive assemblies used in one or more embodiments of driven lock systems as described herein, such as, e.g., drive assembly 60, may be configured to return to a neutral configuration after moving to either an extended configuration or a shortened configuration. Depending on the construction of the driven actuator 66 used in the drive assembly 60, returning the drive assembly 60 to its neutral configuration from either the retracted or extended configurations may be active, i.e., the driven actuator 66 may, in one or more embodiments, be used to return the drive assembly 60 to the neutral configuration. In alternative embodiments, the drive assembly 60 and driven actuator 66 may be configured to passively return the drive assembly 60 to its neutral configuration (through the use of, e.g., springs, pistons, elastomeric members, etc. that are arranged to bias the drive assembly 60 in its neutral configuration in the absence of external forces acting on the drive assembly 60) such that the driven actuator 66 is not activated during return of the drive assembly 60 to its neutral configuration.

In one or more embodiments of drive assemblies as described herein, the drive assembly may include a drive assembly configuration sensor capable of detecting when the drive assembly is in the neutral configuration. Such a configuration sensor may, in one or more embodiments, take the form of a position sensor which may, in or more embodiments, be located within the driven actuator itself (e.g., a micro linear actuator with a built-in position feedback potentiometer, etc.). Alternatively, a drive assembly configuration sensor in one or more embodiments of a drive assembly as described herein may include position sensing apparatus outside of the driven actuator that is configured to detect when the drive assembly is in the neutral configuration and communicate that information to one or both of a driven actuator and control unit.

In other words, after operation of the drive assembly 60 to its extended configuration as seen in, e.g., FIG. 12, the driven actuator 66 returns the drive assembly 60 to its neutral configuration. After operation of the drive assembly 60 to its shortened configuration as seen in, e.g., FIG. 13, the driven actuator 66 returns the drive assembly 62 its neutral configuration. With the drive assembly 60 back in its neutral configuration, manual operation of the driven lock system using a manual actuator as described herein can be performed.

The depicted illustrative embodiments of a driven lock system as described herein and as depicted in FIGS. 4-13 may be particularly well-suited for and adapted to use in the lock assemblies as described in U.S. Pat. No. 9,482,035 (although keyed operation of the lock assemblies as described in that document may not be possible without further adaptation of the driven lock systems as described herein). It should, however, be understood that the driven lock systems as described herein may be used with other lock assemblies as well.

Figure 14A:
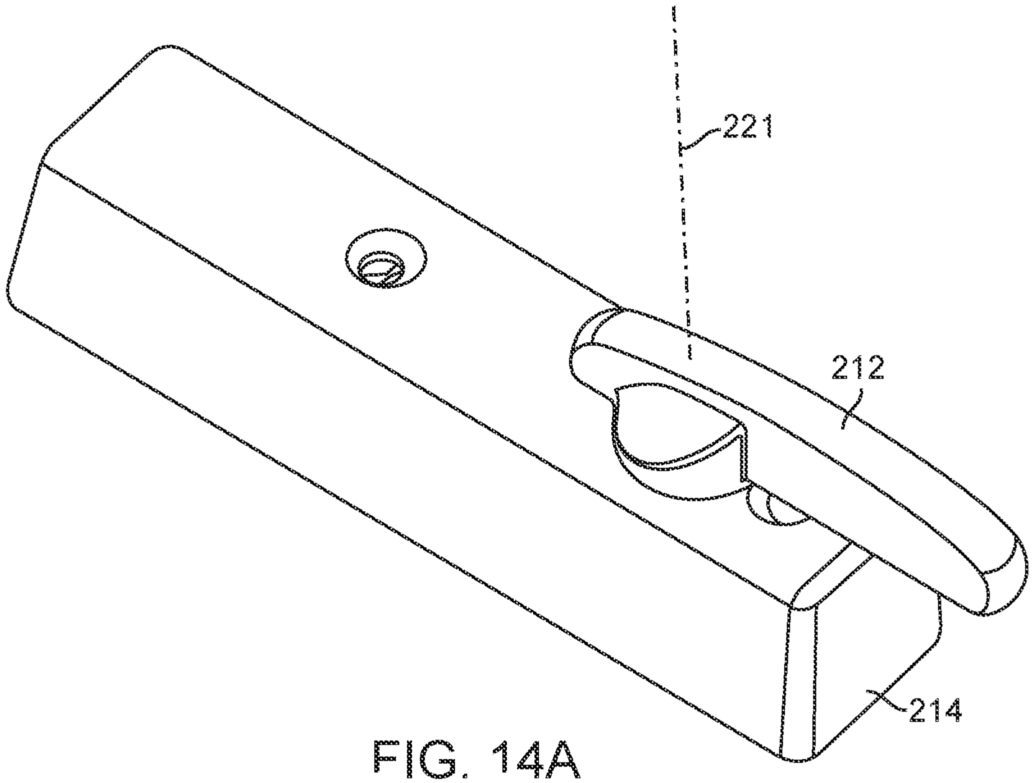
FIG. 14A is a top perspective view of one alternative illustrative embodiment of a lock assembly incorporating another illustrative embodiment of a drive assembly as described herein.
Figure 14B:
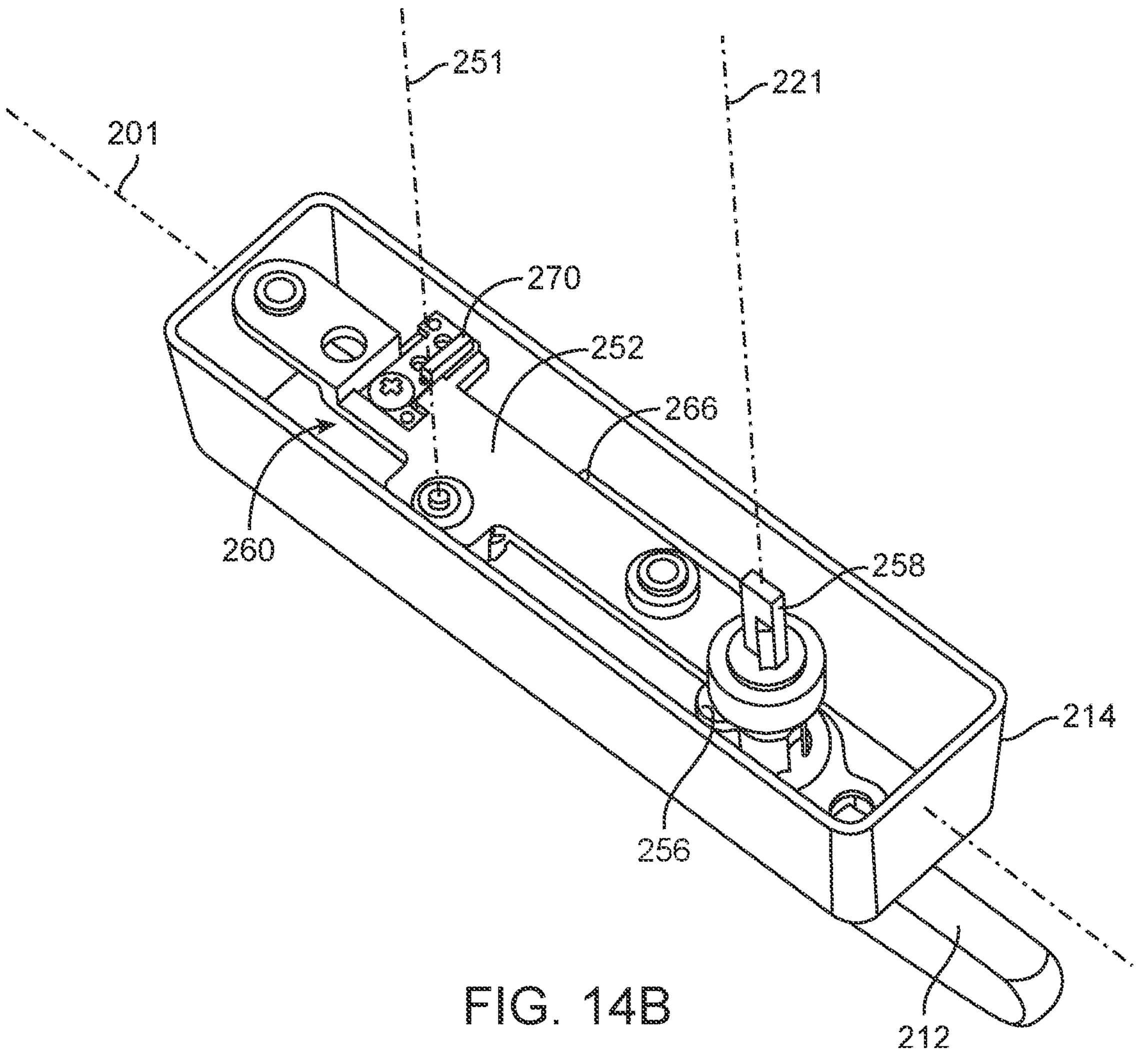
FIG. 14B is a bottom perspective view of the lock assembly of FIG. 14A.

One illustrative alternative embodiment of a drive assembly incorporated into a different lock assembly is depicted in FIGS. 14A and 14B. The illustrative embodiment of a lock actuator assembly depicted in those figures includes a housing 214 carrying a manual actuator 212 in the form of a lever that rotates about lock axis 221 to move a lock mechanism (not shown) between its locked and unlocked states as described herein using a drive tail 258 (see FIG. 14B) that is rotated about axis 221 by the manual actuator 212.

A drive assembly 260 is depicted within the housing 214 and is operably connected to the lock element of a lock mechanism also using drive tail 258 in manner similar to drive assembly 60 as discussed herein. For example, the drive assembly 260 includes a driven actuator 266 mounted on drive assembly base plate 252, with the driven actuator 266 moving along axis 201 as the drive assembly 260 is moved during actuation by, e.g., the manual actuator 212 in a manner similar to the movement of driven actuator 66 of drive assembly 60. Driven actuator 266 moves along axis 201 because of rotation of a lock link 256 about axis 221 and rotation of a stop link (not shown) about axis 251 in, e.g., a manner similar to the operation of links 54 and 56 of drive assembly 60.

The driven actuator 266 of drive assembly 260 can be moved from its neutral configuration to either a shortened configuration or an extended configuration to drive the lock elements between their locked and unlocked states in, e.g., a manner similar to that discussed herein in connection with drive assembly 60.

The drive assembly 260 also includes a lock mechanism status sensor 270 that may, in one or more embodiments, detect the locked or unlocked status of a lock element of a lock mechanism operably connector to the lock actuator depicted in FIGS. 14A and 14B.

Another alternative embodiment of a drive assembly that may be used in a driven lock system as described herein is depicted in FIGS. 15-21. The drive assembly 360 is depicted in FIGS. 15-21 after being removed from a lock actuator assembly. e.g., lock actuator assembly 50 as depicted in FIGS. 5-7 and discussed above.

The illustrative embodiment of drive assembly 360 as depicted in FIGS. 15-21 includes a driven actuator 366 that rotates a drive link 350 about a drive link axis 351. The driven actuator 366 is provided on a drive assembly plate 362 that can be mounted on a lock actuator assembly 50. Although not depicted in FIGS. 15-21, the drive assembly plate 362 may also carry a position sensor used to detect a position of various components of the driven lock system to determine whether the lock mechanism is in the locked or unlocked state as described herein.

The driven actuator used in the drive assemblies of driven lock systems in which a drive link is rotated as described herein may take a variety of different forms. Examples of potentially suitable drive actuators that may be used to rotate the drive link include but are not limited to: electric motors (with or without gearboxes), linear actuators with components capable of converting linear movement to rotational movement, solenoids, piezo electric actuators, magnetic actuators, pneumatic actuators, hydraulic actuators, etc.

The depicted illustrative embodiment of drive assembly 360 is operably connected to a lock element of a lock mechanism through a rotating lock link 356. The lock link 356 rotates about axis 331 and is, itself, operably attached to drive tail 358 which also rotates about axis 331 when lock link 356 rotates.

Referring back to FIGS. 6 and 7, driver assembly 360 may be operably connected to the slide arm 30 of lock actuator assembly 50 through drive tail 358 in a manner similar to that discussed herein with respect to drive assembly 60. In particular, drive tail 358 may be received in drive tail slot 48 (see, e.g., FIG. 7) of drive disc 44 of the depicted illustrative embodiment of lock actuator assembly 50. As a result, rotation of drive tail 358 about axis 131/331 (with both axes 131 and 331 being the same when drive assembly 360 is attached to lock actuator assembly 50) would cause corresponding rotation of drive disc 44 about that axis 131/331.

Rotation of the drive tail 358 and drive disc 44 about axis 131/331 would be converted to translational movement of slide arm 30 along axis 101 using a pin and slot arrangement that operably connects the drive disc 44 with the slide arm 30. In particular, drive disc 44 includes a pin 45, while slide arm 30 includes a slot 38 in which pin 45 is located. Rotation of the drive disc 44 about axis 131/331 causes slide arm 30 to move along axis 101. In particular, clockwise rotation of drive disc 44 about axis 131/331 in FIG. 7 will cause slide arm 30 to move downward as depicted in that view which corresponds to the position of slide arm 30 as depicted in FIG. 6. Correspondingly, counterclockwise rotation of drive disc 44 after such clockwise rotation will result in a return of the slide arm 30 to its position as seen in FIG. 7.

The above discussion describes the interaction between drive disc 44 and slide arm 30 during actuation by the drive assembly 60. Interaction between the drive disc 44 and the slide arm 30 may also be caused by the manual actuator 12 which, in the depicted embodiment, is operably connected to slide arm 30. Movement of the slide arm 30 in translation along axis 101 using the manual actuator 12 will also cause drive disc 44 to rotate about axis 131. Details with respect to the connection of the slide arm 30 to manual actuator 12 such that translational movement of the manual actuator 12 causes corresponding translational movement of the slide arm 30 can be found in U.S. Pat. No. 9,482,035 (Wolf).

The illustrative embodiment of drive assembly 360 depicted in FIGS. 15-21 is operably connected to the lock element of lock mechanism through the lock link 356 that is rotatable about lock link axis 331. Similar to drive assembly 60, illustrative embodiment of drive assembly 360 also includes a driven actuator 366 that is configured to move the drive assembly 360 between an extended configuration, a neutral configuration, and a shortened configuration as part of the process of driving the lock element of the attached lock mechanism between its locked and unlocked states using driven actuator 366, while also allowing for manual operation of the lock mechanism without requiring that the driven actuator 366 be back driven during manual operation as discussed herein.

Figure 18:
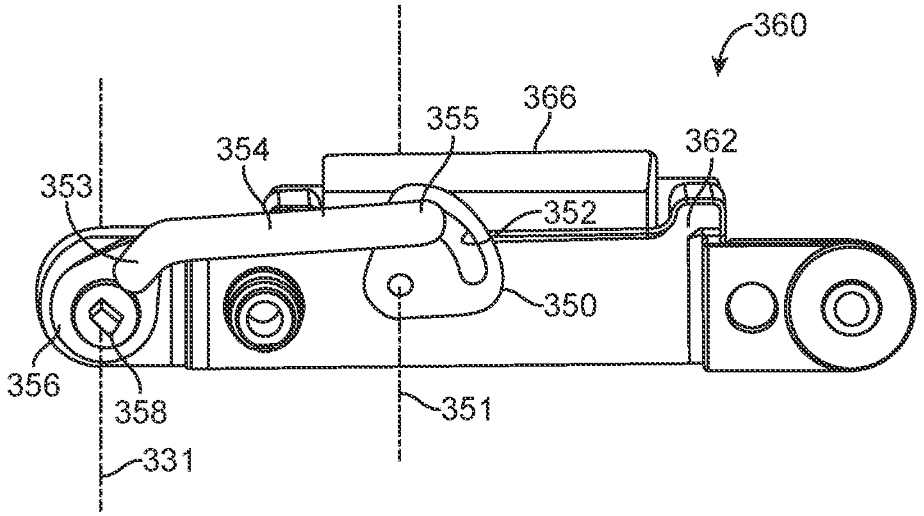

In the depicted illustrative embodiment, the drive link 350 includes a drive link slot 352. The drive actuator 366 is configured to rotate the drive link 350 about drive link axis 351 between a shortened position (as seen in, e.g., FIG. 20) and an extended position (as seen in, e.g., FIG. 18). The drive link slot 352 is located closer to the lock link axis 331 when the drive link 350 is in the shortened position depicted in FIG. 20 than when drive link 350 is in the extended position as depicted in FIG. 18. The drive link 350 is in the shortened position when the drive assembly 360 is in the shortened configuration, and the drive link 350 is in the extended position when the drive assembly 360 is in the extended configuration.

The depicted illustrative embodiment of drive assembly 360 also includes a transfer arm 354 having a lock end 353 connected to the lock link 356 and a drive end 355 connected to the drive link 350. In one or more embodiments, the drive end 355 of the transfer arm 354 is connected to and configured for movement within the drive link slot 352 as the drive link 350 moves between the shortened position and the extend position.

In the depicted illustrative embodiment of drive assembly 360, the drive link 350 may also be rotated into a neutral position between the shortened position and the extended position. The drive link 350 is depicted in its neutral position in FIGS. 15-17, 19 and 21. When the lock link 350 is in its neutral position manual operation of the lock mechanism between its locked and unlocked states can be performed without requiring back driving of the driven actuator 366.

Figure 15:
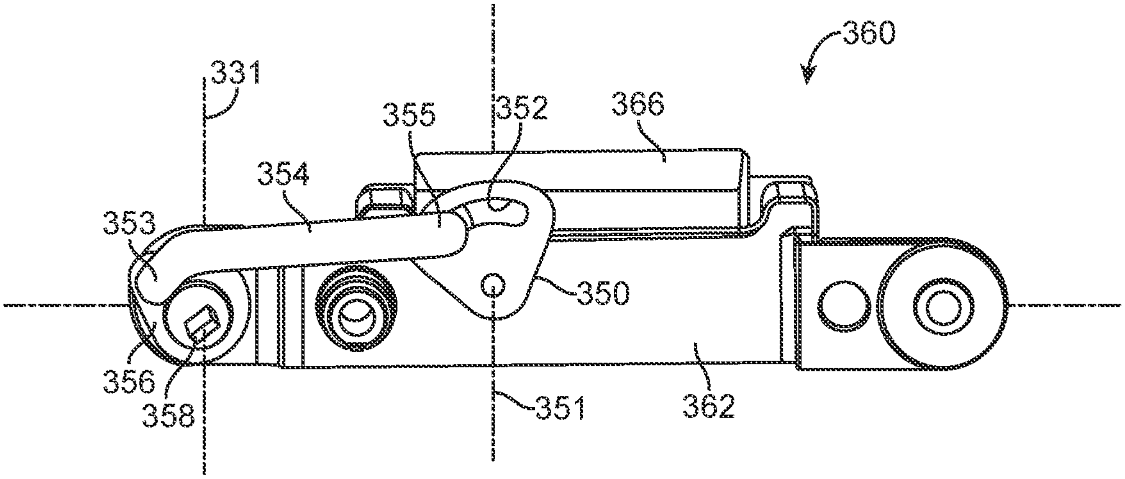
FIG. 15 is a perspective view of another illustrative embodiment of a drive assembly that may be used in one or more embodiments of a driven lock system as described herein.
Figure 16:
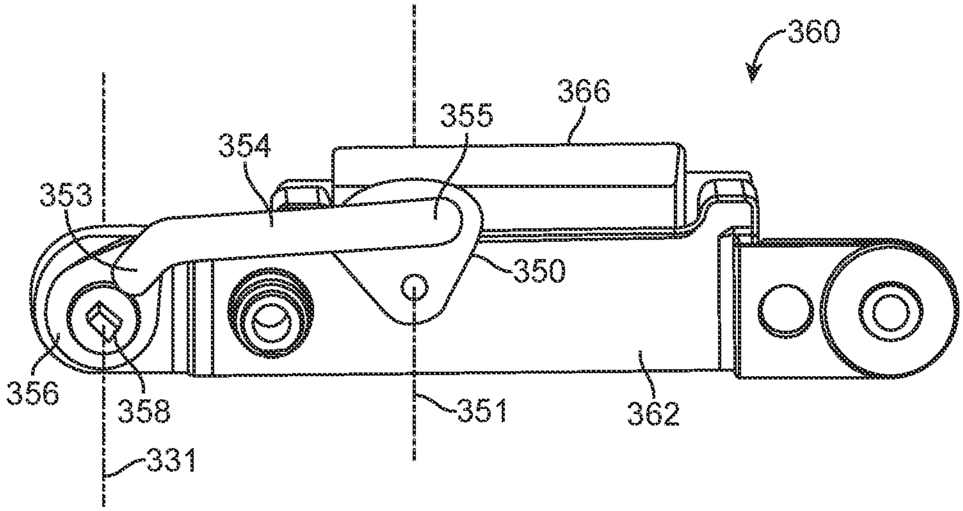
FIG. 16 is a perspective view of the drive assembly of FIG. 15 after movement of a lock element of an attached lock mechanism using a manual actuator.

Manual operation of a lock mechanism operably attached to the drive assembly 360 and its effect on drive assembly 360 is illustrated in FIGS. 15-16. For example, lock link 356 and associated drive tail 358 as depicted in FIG. 15 may be in a rotational position corresponding to one of a locked/unlocked state of a lock mechanism to which drive assembly 360 is attached. The drive link 350 is in its neutral position in FIG. 15 with the drive end 355 located at one end of drive link slot 352 which, in the depicted illustrative embodiment, is the end of drive link slot 352 closest to lock link axis 331.

Manual operation of the lock mechanism to move the lock element from its locked/unlocked state as depicted in FIG. 15 to the opposite state as depicted in FIG. 16 results in rotation of the lock link 356 and drive tail 358 about lock link axis 331 such that lock link 356 is moved into the position depicted in FIG. 16. Rotation of lock link 356 about lock link axis 331 moves transfer arm 354 to the right as seen in FIG. 16 because, as discussed herein, transfer arm 354 is operably attached to lock link 356 at its lock end 353. Movement of transfer arm 354 results in movement of the drive end 355 of transfer arm 354 to the opposite end of drive link slot 352.

Because drive link 350 is in its neutral position in FIGS. 15-16, rotation of lock link 356 and corresponding movement of transfer arm 354 does not result in any rotational movement of drive link 350 about drive link axis 351. In other words, the drive link 350 remains in the neutral position when moving the lock element of attached lock mechanism between the locked and unlocked states using a manual actuator. As a result, a user manually operating a lock mechanism to lock and/or unlock the lock mechanism attached to drive assembly 360 would effectively feel no resistance to that movement from drive actuator 366 of drive assembly 360.

Figure 17:
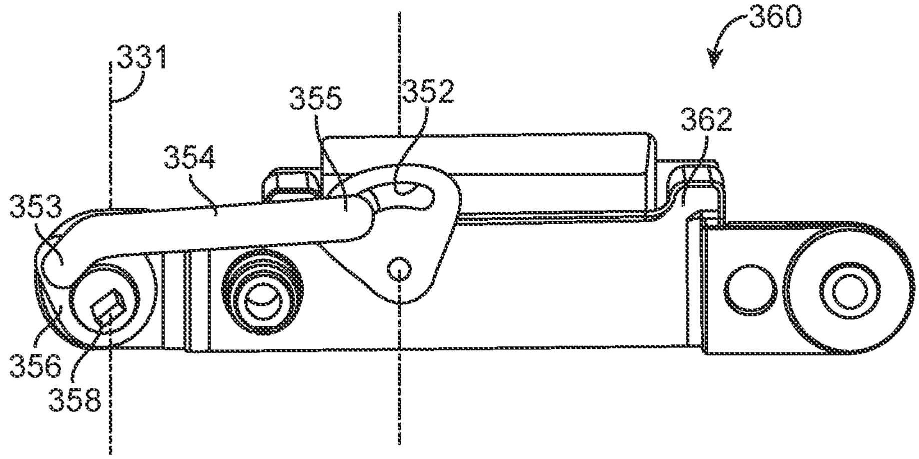
FIGS. 17-19 depict one embodiment of driven operation of the drive assembly of FIG. 15 using the drive actuator of the drive assembly in which the drive assembly is moved from its neutral configuration of FIG. 17 to its extended configuration of FIG. 18, with a return to the neutral configuration in FIG. 19.
Figure 19:
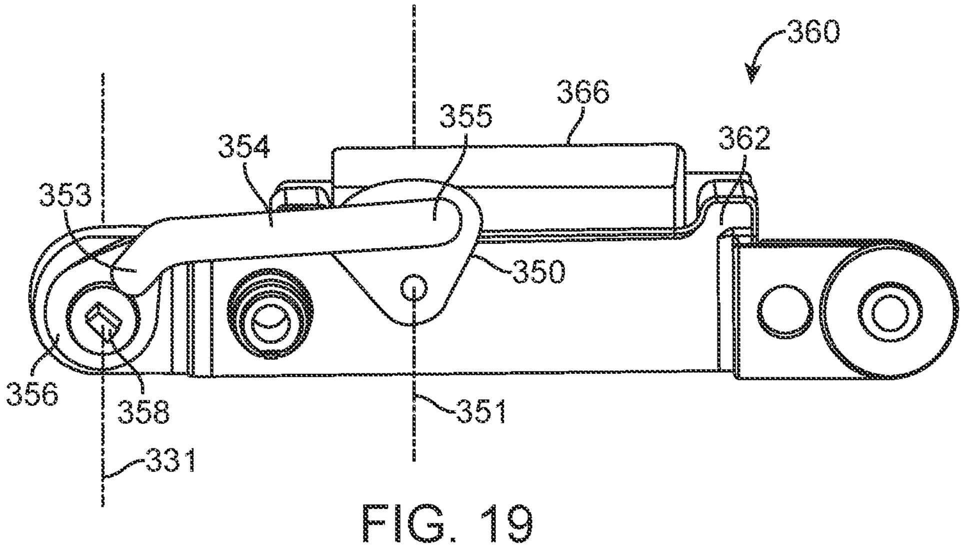

The illustrative embodiment of drive assembly 360 is depicted under driven operation in FIGS. 17-19. For example, lock link 356 and associated drive tail 358 as depicted in FIG. 17 may be in a rotational position corresponding to one of a locked/unlocked state of a lock mechanism to which drive assembly 360 is attached. Again, drive link 350 is in its neutral position in FIG. 17 with the drive end 355 located at one end of drive link slot 352 which, in the depicted illustrative embodiment, is the end of drive link slot 352 closest to lock link axis 331.

Driven operation of the lock mechanism to move the lock element from its locked/unlocked state as depicted in FIG. 17 to the opposite state as depicted in FIGS. 18-19 requires rotation of the lock link 356 and drive tail 358 about lock link axis 331 such that lock link 356 is moved into the position depicted in FIGS. 18-19. Rotation of lock link 356 about lock link axis 331 is caused by rotation of drive link 350 to its extended position as seen in FIG. 18. Drive actuator 366 is used to rotate drive link 350 about drive link axis 351 to its extended position from the neutral position of FIG. 17. Rotation of drive link 350 to its extended position as seen in FIG. 18 moves transfer arm 354 to the right such that drive end 355 of transfer arm 354 moves away from lock link axis 331. Lock end 353 of transfer arm 354 is operably attached to lock link 356 such that movement of transfer arm 354 by drive link 350 causes corresponding rotation of lock link 356 about lock link axis 331.

Driven operation of the lock mechanism as depicted in FIGS. 17-18 is followed by rotation of drive link 350 back to its neutral position as seen in FIG. 19. That movement causes drive end 355 of transfer arm 354 to move within drive link slot 352, but does not cause transfer arm 354 to move such that lock link 356 remains in the position to which it was moved by rotation of drive link 350 to its extended position. Furthermore, rotation of drive link 350 to its neutral position as depicted in FIG. 19 once again places drive assembly 360 in a configuration that allows for manual operation of an attached lock mechanism without requiring back driving of the drive actuator 366 of drive assembly 360 as described herein.

Figure 20:
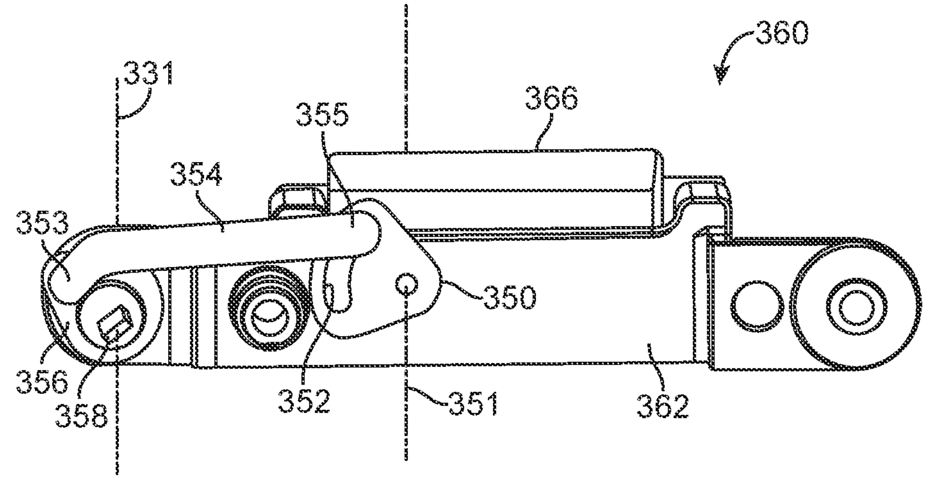
FIGS. 20-21 depict one embodiment of driven operation of the drive assembly of FIG. 15 using the drive actuator of the drive assembly in which the drive assembly is moved from its neutral configuration of FIG. 19 to its shortened configuration of FIG. 20 and returned to the neutral configuration in FIG. 21.
Figure 21:
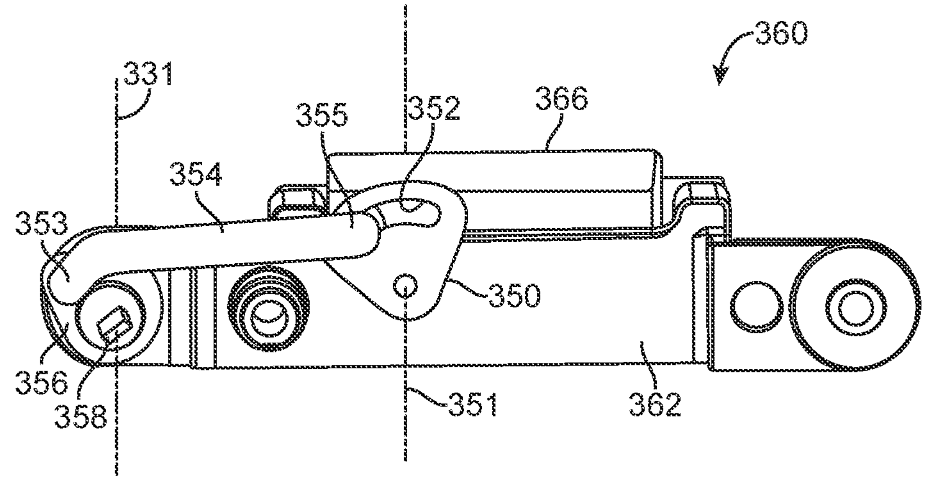

Driven operation of the drive assembly 362 move an attached lock mechanism from the locked/unlocked state as depicted in FIG. 19 to its opposite state is depicted in FIGS. 20-21. In particular, operation of drive actuator 366 to rotate drive link 350 about drive link axis 351 from its neutral position as seen in FIG. 19 to its shortened position as seen in FIG. 20 forces lock link 356 to rotate about lock link axis 331 through a force applied by transfer arm 354 which is connected at its lock end 353 to lock link 356 and connected to drive link 350 at its drive end 355. As discussed herein, rotation of lock link 356 about lock link axis 331 will move the attached lock mechanism between its locked and unlocked states.

Again, driven operation of the drive link 350 to its shortened position by drive actuator 366 is, in one or more embodiments, followed by rotation of drive link 350 in the opposite direction such that drive link 350 returns to its neutral position as seen in FIG. 21. As discussed herein, rotation of drive link 350 to its neutral position as depicted in FIG. 21 allows for manual operation of an attached lock mechanism without requiring back driving of the drive actuator 366 of drive assembly 360 as described herein. Rotation of the drive link 350 back to its neutral position does result in movement of drive end 355 of transfer arm 354 through drive link slot 352, but does not cause any corresponding rotation of lock link 356.

In one or more embodiments of a drive assembly such as illustrative embodiment of drive assembly 360, movement of the drive assembly 360 from the shortened configuration as seen in FIG. 20 to the extended configuration as seen in FIG. 18 would rotate the lock link 356 in a first direction about the lock link axis 331 to move the lock element of an attached lock mechanism between the locked state and the unlocked state; and movement of the drive assembly 360 from the extended configuration as seen in FIG. 18 to the shortened configuration as seen in FIG. 20 would rotate the lock link 356 in a second direction about the lock link axis 331 to move the lock element of an attached lock mechanism between the locked state and the unlocked state, wherein the first and second directions are opposite directions.

Figure 22:
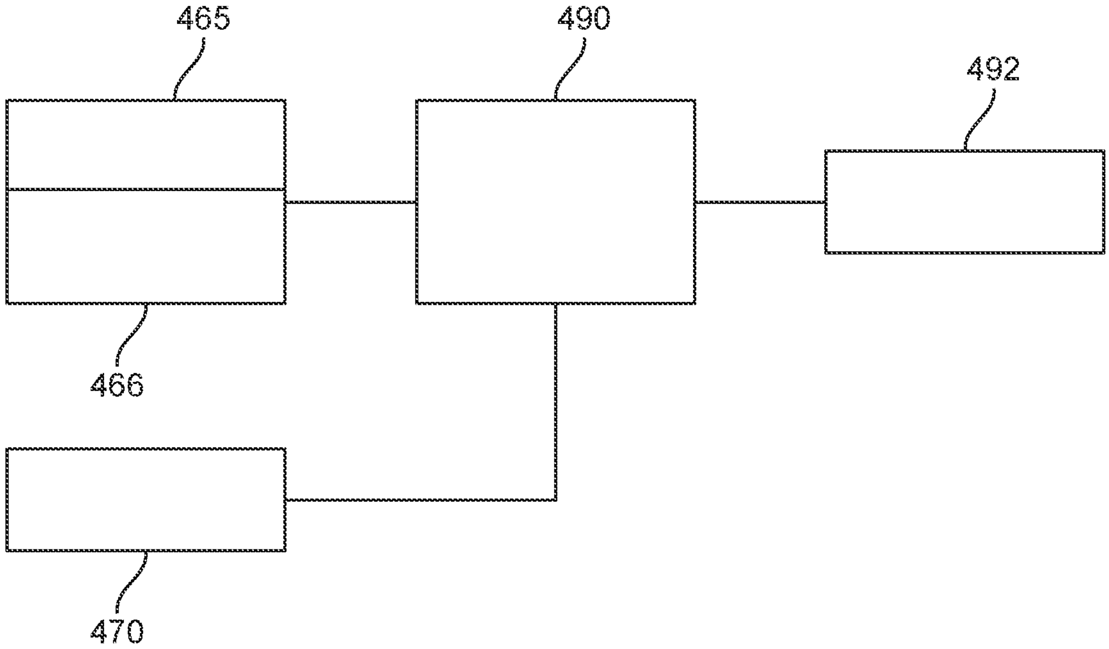
FIG. 22 is a schematic diagram of one illustrative embodiment of a control system that may be used in connection with one or more embodiments of the driven lock systems described herein.

One illustrative embodiment of a control unit 490 that may be used in one or more embodiments of a drive system as described herein is depicted in FIG. 22. The control unit 490 may be provided in any suitable form and may, for example, include a power supply (in the form of one or more of, e.g., AC line power, battery and/or solar, capacitive, etc.), memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The control units may include one or more of any suitable input devices configured to allow a user to operate the drive system (e.g., keyboards, touchscreens, mice, trackballs, buttons, etc.), as well as display devices configured to convey information to a user (e.g., LCD displays, monitors, indicator lights, audible devices (e.g., speakers, buzzers, sirens, etc.) etc.).

In the depicted embodiment, the control unit 490 is connected to various components that may be found in one or more of the drive assemblies described herein. As depicted in FIG. 22, the control unit 490 is operably connected to the driven actuator 466 of a drive assembly, as well as a lock mechanism state sensor 470. Also depicted in FIG. 22 is a drive assembly configuration sensor 465 that may be integrated into the driven actuator 466 as depicted or, alternatively, may be located outside of driven actuator 466 with a separate line of communication to the control unit 490.

Also depicted in FIG. 22 is an optional communication unit 492 which may be used to transmit and/or receive control signals through one or more of mechanical, hydraulic, wired and/or wireless connections (including any suitable electromagnetic signal, light, etc.). Such control signals may include signals used for operation of the drive assemblies and/or signals meant to communicate a status of the drive assemblies and/or lock mechanisms. In one or more alternative embodiments, the communication unit 492 may be configured for wireless control of the driven lock systems as described herein using, e.g., a smart phone or other wireless control device through any suitable wireless communication protocol (including, but not limited to: Bluetooth, ZigBee, a wireless local area network (WLAN), WiFi, RF, etc.).

Although depicted as separate units in FIG. 22, in one or more embodiments the control unit 490 and/or communication unit 492 may be integrated into the driven actuator 466 or the lock mechanism state sensor 470. Where the control unit 490 and/or communication unit 492 are provided separately from the driven actuator 466 and/or lock mechanism state sensor 470, the control unit 490 and/or communication unit 492 may still be packaged with the drive assembly 460 such that all of the components, i.e., the control unit 490 and/or communication unit 492 may be located within a panel frame member along with the driven lock systems. In such an embodiment, a panel electrical connector, if provided, may be used solely to provide power to the various components of the driven lock system.

Alternatively, the control unit 490 and/or communication unit 492 may be located remote from the drive assembly 460, e.g., on or in a fenestration unit frame carrying the movable panel in which the driven lock system is located or elsewhere. In such embodiments, the panel electrical connectors as described herein may be used to provide power and to transmit signals to and/or from the drive assemblies and/or lock mechanism state sensors as described herein.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the hinged window assemblies and drive systems are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A driven lock system for a fenestration unit, the system comprising:

a lock mechanism comprising a lock element movable between a locked state and an unlocked state;

a lock actuator assembly comprising a manual actuator operably coupled to the lock element of the lock mechanism, the manual actuator configured to move the lock element between the locked state and the unlocked state;

a drive assembly operably connected to the lock element of the lock mechanism, wherein the drive assembly comprises a driven actuator comprising a first end and a second end, wherein the driven actuator is configured to move the drive assembly between an extended configuration, a neutral configuration, and a retracted configuration;

wherein the first end and the second end are located farther away from each other when the drive assembly is in the extended configuration than when the drive assembly is in the neutral configuration;

wherein the first end and the second end are located closer to each other when the drive assembly is in the retracted configuration than when the drive assembly is in the neutral configuration;

wherein a distance between the first end and the second end of the driven actuator remains constant when the lock element is moved between the locked state and the unlocked state using the manual actuator;

wherein movement of the drive assembly from the neutral configuration to the extended configuration changes the lock element between the locked state and the unlocked state;

wherein movement of the drive assembly from the neutral configuration to the retracted configuration changes the lock element between the locked state and the unlocked state;

and wherein the driven actuator of the drive assembly moves when the lock element is moved between the locked and unlocked states using the manual actuator.

2. A system according to claim 1, wherein the drive assembly remains in the neutral configuration when the lock element is moved between the locked state and the unlocked state using the manual actuator.

3. A system according to claim 1, wherein the drive assembly is configured to return to the neutral configuration after the driven actuator moves the drive assembly to the extended configuration.

4. A system according to claim 1, wherein the drive assembly is configured to return to the neutral configuration after the driven actuator moves the drive assembly to the retracted configuration.

5. A system according to claim 1, wherein the lock actuator assembly comprises a slide arm operably coupled to the manual actuator and the lock mechanism, wherein movement of the manual actuator is configured to move the slide arm between a locked position and an unlocked position, wherein the slide arm is in the locked position when the lock element of the lock mechanism is in the locked state, and wherein the slide arm is in the unlocked position when the lock element of the lock mechanism is in the unlocked state.

6. A system according to claim 5, wherein the drive assembly is operably coupled to the lock element through the slide arm, wherein movement of the drive assembly from the neutral configuration to the retracted configuration moves the slide arm to the locked position or the unlocked position.

7. A system according to claim 5, wherein the drive assembly is operably coupled to the lock element through the slide arm, wherein movement of the drive assembly from the neutral configuration to the extended configuration moves the slide arm to the locked position or the unlocked position.

8. A system according to claim 1, wherein the drive assembly comprises a rotating lock link at the first end of the driven actuator, and wherein the driven actuator is operably connected to the slide arm through the rotating lock link.

9. A system according to claim 8, wherein the drive assembly comprises a rotating stop link at the second end of the driven actuator, wherein rotation of the rotating stop link is limited, when moving the drive assembly to the extended configuration, by a rear stop, and further wherein rotation of the rotating stop link is limited, when moving the drive assembly to the retracted configuration, by a front stop.

10. A system according to claim 1, wherein the system comprises a lock mechanism state sensor configured to detect when the lock element is in at least one of the locked state and the unlocked state.

11. A system according to claim 10, wherein the lock actuator assembly comprises a slide arm operably coupled to the manual actuator and the lock mechanism, wherein the slide arm is configured to move between a locked position and an unlocked position, wherein the slide arm is in the locked position when the lock element of the lock mechanism is in the locked state, and wherein the slide arm is in the unlocked locked position when the lock element of the lock mechanism is in the unlocked state.

12. A fenestration unit comprising:

a fenestration unit frame;

a movable panel configured for movement in the fenestration unit frame between an open position and a closed position, wherein the movable panel comprises a panel frame member positioned adjacent a fenestration unit frame member when the movable panel is in the closed position; and a driven lock system according to claim 1 located in the panel frame member.

13. A method of operating a lock on a movable panel of a fenestration unit, wherein the method comprises:

moving a lock element of a lock mechanism between a locked state and an unlocked state using a manual actuator of a lock actuator assembly operably coupled to the lock element of the lock mechanism; and moving the lock element between the locked state and the unlocked state using a driven actuator of a drive assembly operably connected to the lock element, wherein the driven actuator comprises a first end and a second end, wherein the driven actuator is configured to move the drive assembly between an extended configuration, a neutral configuration, and a retracted configuration, wherein the first end and the second end are located farther away from each other when the drive assembly is in the extended configuration than when the drive assembly is in the neutral configuration, wherein the first end and the second end are located closer to each other when the drive assembly is in the retracted configuration than when the drive assembly is in the neutral configuration, wherein a distance between the first end and the second of the driven actuator remains constant when moving the lock element between the locked state and the unlocked state using the manual actuator;

wherein moving the lock element between the locked state and the unlocked state using the driven actuator comprises moving the drive assembly from the neutral configuration to the extended configuration;

wherein moving the lock element between the locked state and the unlocked state using the driven actuator comprises moving the drive assembly from the neutral configuration to the retracted configuration, and wherein the driven actuator of the drive assembly moves when the lock element is moved between the locked and unlocked states using the manual actuator.

14. A method according to claim 13, wherein the drive assembly remains in the neutral configuration when moving the lock element between the locked state and the unlocked state using the manual actuator.

15. A method according to claim 13, wherein the method comprises returning the drive assembly to the neutral configuration after moving the drive assembly to the extended configuration.

16. A method according to claim 13, wherein the method comprises returning the drive assembly to the neutral configuration after moving the drive assembly to the retracted configuration.

17. A method according to claim 13, wherein the lock actuator assembly comprises a slide arm operably coupled to the manual actuator and the lock mechanism, wherein moving the manual actuator moves the slide arm between a locked position and an unlocked position, wherein the slide arm is in the locked position when the lock element of the lock mechanism is in the locked state, and wherein the slide arm is in the unlocked locked position when the lock element of the lock mechanism is in the unlocked state.

18. A method according to claim 17, wherein moving the drive assembly from the neutral configuration to the retracted configuration moves the slide arm to the locked position or the unlocked position;

and wherein moving the drive assembly from the neutral configuration to the extended configuration moves the slide arm to the locked position or the unlocked position.

19. A method according to claim 13, wherein the method comprises detecting when the lock element is in the locked state, and wherein the method further comprises moving the drive assembly to the extended configuration or the retracted configuration as needed to move the lock element to the unlocked state.

20. A method according to claim 19, wherein the lock actuator assembly comprises a slide arm operably coupled to the manual actuator and the lock mechanism, wherein the slide arm is in a locked position when the lock element of the lock mechanism is in the locked state, and wherein the slide arm is in an unlocked position when the lock element of the lock mechanism is in the unlocked state;

wherein detecting when the lock element is in the locked state comprises determining when the slide arm is in the locked position.

* * * * *